(12) United States Patent
Choi et al.

(10) Patent No.: US 10,804,043 B2
(45) Date of Patent: Oct. 13, 2020

(54) METHOD OF PREPARING CORE-SHELL STRUCTURE NANOPARTICLE USING STRUCTURE-GUIDED COMBUSTION WAVES

(71) Applicant: KOREA UNIVERSITY RESEARCH AND BUSINESS FOUNDATION, Seoul (KR)

(72) Inventors: Won-joon Choi, Seoul (KR); Tae-han Yeo, Seoul (KR); Dong-joon Shin, Incheon (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 106 days.

(21) Appl. No.: 16/218,929

(22) Filed: Dec. 13, 2018

(65) Prior Publication Data
US 2019/0198261 A1  Jun. 27, 2019

(30) Foreign Application Priority Data
Dec. 27, 2017  (KR) .................. 10-2017-0180888

(51) Int. Cl.
| | | |
|---|---|---|
| *H01G 11/86* | (2013.01) | |
| *H01G 11/02* | (2013.01) | |
| *H01G 11/42* | (2013.01) | |
| *H01G 11/36* | (2013.01) | |
| *H01G 11/46* | (2013.01) | |
| *H01G 11/24* | (2013.01) | |

(52) U.S. Cl.
CPC ............. *H01G 11/86* (2013.01); *H01G 11/02* (2013.01); *H01G 11/24* (2013.01); *H01G 11/36* (2013.01); *H01G 11/42* (2013.01); *H01G 11/46* (2013.01)

(58) Field of Classification Search
CPC ............................. C01B 32/162; H01G 11/86
USPC ............................................................ 427/212
See application file for complete search history.

(56) References Cited

FOREIGN PATENT DOCUMENTS

| KR | 10-0869572 B1 | 11/2008 |
| KR | 10-1308020 B | 9/2013 |
| KR | 10-2014-0049657 A | 4/2014 |
| KR | 10-1754018 B1 | 7/2017 |

OTHER PUBLICATIONS

Yeo, DC-field-driven combustion waves for one-step fabrication of reduced manganese oxide/multi-walled carbon nanotube hybrid nanostructures as high-performance supercapacitor electrodes, J. Mater. Chem. A, 2017, 5, p. 24707-24719 (Year: 2017).*
Shin, Facile One-pot Transformation of Iron Oxides from Fe2O3 Nanoparticles to Nanostructured Fe3O4@C Core-Shell Composites via Combustion Waves, Scientific Reports, Feb. 2016, p. 1-10 (Year: 2016).*
Lee, Manipulation of combustion waves in carbon-nanotube/fuel composites by highly reactive Mg nanoparticles, Nanoscale, 2015, 7, 17071 (Year: 2015).*
Dongjoon Shin et al., Facile fabrication of carbon shell-coated manganese oxides nanostructures using structure-guided combustion waves and their electrochemical applications, pp. 108-110, Korea.

* cited by examiner

*Primary Examiner* — Tabatha L Penny
(74) *Attorney, Agent, or Firm* — Hauptman Ham, LLP

(57) ABSTRACT

A method of synthesizing multi-shell structure nanoparticles includes uniformly distributing core nanoparticles to a first porous fuel membrane, coating the core nanoparticles fixed to the first porous fuel membrane with a fuel, and combusting the fuel coated on the core nanoparticles and the first porous fuel membrane to coat a first carbon film on surfaces of the core nanoparticles.

13 Claims, 23 Drawing Sheets

Disperse NP

NC Membrane

Filter NP through NC Membrane

Spray Collodion Solution

Dry and Coat Collodion Solution

Combustion and Coat Carbon Film

Dip NP in KMnO4 Solution

Filter NP through NC Membrane

Spread Collodion Solution

Dry and Coat Collodion Solution

Combustion and Coat Carbon Film

Fabricate Carbon Nanotube film

Filter NP through Carbon Nanotube

METHOD OF PREPARING CORE-SHELL STRUCTURE NANOPARTICLE USING STRUCTURE-GUIDED COMBUSTION WAVES

CROSS-REFERENCE TO RELATED APPLICATIONS

This U.S. non-provisional patent application claims priority under 35 U.S.C. § 119 to Korean Patent Application No. 10-2017-0180888, filed on Dec. 27, 2017, in the Korean Intellectual Property Office, the entire contents of which are hereby incorporated by reference.

TECHNICAL FIELD

The present disclosure relates to synthesis of nanoparticles and, more particularly, to synthesis of multi-shell structure nanoparticles.

BACKGROUND

Synthesis of nanoparticles of a core and shell structure is disclosed in Korean Patent Registration No. 10-0869572 entitled "CORE SHELL NANOPARTICLES AND PREPARATION METHOD THEREOF", Korean Patent Registration No. 10-1308020 entitled "COMPOSITE POWDERS HAVING CORE-SHELL STRUCTURE AND METHODS FOR FABRICATING THE SAME", Korean Patent Registration No. 10-1754018 entitled "METAL OXIDES FABRICATION METHOD WITH THE CORE AND SHELL STRUCTURE OF METAL OXIDE", and the like.

Korean Patent Registration No. 10-1754018 discloses a method of reducing metal oxide nanoparticles using combustion waves and simultaneously coating carbon on surfaces of the nanoparticles. However, the drop-cast method provides nanoparticles aggregated with each other.

A redox pseudo-capacitor is revealed by charge transfer while electrochemically adsorbing ions to a redox active position on a surface of an active material. Metal oxides, such as $MnO_2$, $NiO_2$, $CuO$, and $RuO_2$, used as active materials of pseudo-capacitors storing electric charges through an electrochemical redox have disadvantages such as low electrical conductivity and reduction in long-term stability. Accordingly, there is a need for a novel structure of nanoparticle materials and a method of preparing the same that increase electrical conductivity of an active material and increase long-term stability.

SUMMARY

An aspect of the present disclosure is to provide a method of simply synthesizing a multi-core/shell structure having a higher application value than a conventional simple inorganic/organic core/shell structure without a long-term high-temperature thermal treatment or a complicated chemical process.

Another aspect of the present disclosure is to provide a method of simply synthesizing a multi-core/shell structure by repeatedly forming a carbon film on surfaces of nanoparticles in a mixture of nanoparticles and an organic chemical fuel using structure-guided combustion waves that are self-propagating combustion waves due to ignition of a chemical fuel, reducing the carbon film to a specific material using a redox, and covering the carbon film using the combustion waves.

Another aspect of the present disclosure is to provide a method of preparing nanoparticles of a multi-core/shell structure in which core/shell structure nanoparticles are separated from each other without being aggregated during preparation of the core/shell structure nanoparticles.

Another aspect of the present disclosure is to provide multi-core/shell structure nanoparticle as active materials of a pseudo-capacitor.

According to an aspect of the present disclosure, a method of synthesizing multi-shell structure nanoparticles includes uniformly distributing core nanoparticles to a first porous fuel membrane, coating the core nanoparticles fixed to the first porous fuel membrane with a fuel, and combusting the fuel coated on the core nanoparticles and the first porous fuel membrane to coat a first carbon film on surfaces of the core nanoparticles.

In example embodiments, the method may further include at least one of replacing the first carbon film with a metal oxide layer using a reduction/oxidation (redox) reaction to prepare preliminary nanoparticles, uniformly distributing the preliminary nanoparticles to a second porous fuel membrane, coating the preliminary nanoparticles fixed to the second porous fuel membrane with a fuel, and combusting the fuel coated on the preliminary nanoparticles and the second porous fuel membrane to coat the second carbon film on surfaces of the preliminary nanoparticle.

In example embodiments, the uniformly distributing core nanoparticles to a first porous fuel membrane may include mixing the core nanoparticles with deionized water and dispersing the mixture using a sonicator, uniformly distributing the core nanoparticles to the first porous fuel membrane using vacuum filtration, and drying the core nanoparticle/porous fuel membrane structure.

In example embodiments, the coating the core nanoparticles fixed to the first porous fuel membrane with a fuel may include spraying a collodion solution, in which a fuel is dissolved in an organic solve, onto the first porous fuel membrane and drying the sprayed collodion solution.

In example embodiments, the combusting the fuel to coat a first carbon film on surfaces of the core nanoparticles may include igniting the fuel and the first porous fuel membrane using laser heating or Joule heating to coat a first carbon film on the surfaces of the core nanoparticles by structure-guided combustion waves.

In example embodiments, the metal oxide layer may be a manganese dioxide. The replacing the first carbon film with a metal oxide layer using a redox reaction to prepare preliminary nanoparticles may include dipping the core nanoparticles with the first carbon film in an aqueous solution of $KMnO_4$ to reduce the first carbon film into the metal oxide layer by a reduction/oxidation (redox) reaction of $KMnO_4$ and carbon.

In example embodiments, the uniformly distributing the preliminary nanoparticles to a second porous fuel membrane may include mixing the preliminary nanoparticles with deionized water and dispersing the mixture using a sonicator, uniformly distributing the preliminary nanoparticles to the second porous fuel membrane using vacuum filtration, and drying the preliminary nanoparticle/second porous fuel membrane structure. The coating the preliminary nanoparticles fixed to the second porous fuel membrane with a fuel may include spraying a collodion solution, in which a fuel is dissolved in an organic solvent, onto the second porous fuel membrane and drying the sprayed the collodion solution.

In example embodiments, the combusting the fuel coated on the preliminary nanoparticles and the second porous fuel membrane to coat the second carbon film on surfaces of the preliminary nanoparticle may include igniting the fuel and the second porous fuel membrane using laser heating or Joule heating to coat the second carbon film on the surfaces of the preliminary nanoparticles by self-propagation combustion waves.

In example embodiments, the core nanoparticle may be a metal particle or a metal-alloy particle including at least one of copper (Cu), silver (Ag), gold (Au), nickel (Ni), and aluminum (Al), or a metal oxide particle including at least one of $SiO_2$, $Al_2O_3$, $ZrO_3$, and $TiO_2$.

In example embodiments, the metal oxide layer may include at least one of $MnO_2$ and $RuO_2$.

In example embodiments, each of the first and second porous fuel membranes may be a nitrocellulose membrane, and the fuel may be nitrocellulose, a chemical fuel containing a nitro group, or a combustible organic matter.

Nanoparticles according to an example embodiment of the present disclosure are prepared by the above-described method.

A method of fabricating an electrode including nanoparticles according to an example embodiment of the present disclosure includes uniformly distributing core nanoparticles to a first porous fuel membrane, coating the core nanoparticles fixed to the first porous fuel membrane with a fuel, combusting the fuel coated on the core nanoparticles and the first porous fuel membrane to coat the first carbon film on surfaces of the core nanoparticles, replacing the first carbon film with the metal oxide layer to produce preliminary nanoparticles, uniformly distributing the preliminary particles to a second porous fuel membrane, coating the preliminary nanoparticles fixed to the second porous fuel membrane with a fuel, and combusting the fuel coated on the preliminary nanoparticles and the second porous fuel membrane to coat a second carbon film on surfaces of the preliminary nanoparticles.

In example embodiments, the method may include dispersing the multi-shell structure nanoparticles in deionized water to prepare a multi-shell structure dispersing agent, forming a carbon nanotube film by means of vacuum filtration using a carbon nanotube dispersing agent in which in which carbon nanotubes are dispersed in an aqueous solution of sodium dodecyl sulfate (SDS), filtering the multi-shell structure nanoparticle dispersing agent through the carbon nanotube film to adsorb the multi-shell nanoparticle to the carbon nanotube film, and attaching the carbon nanotube film, to which the multi-shell structure nanoparticles are adsorbed, to an electrode of a supercapacitor.

An electrode according to an example embodiment of the present disclosure is fabricated by the above-described method of fabricating an electrode including nanoparticles.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

FIG. 1A is conceptual diagram illustrating a method of synthesizing multi-shell structure nanoparticles according to an example embodiment of the present disclosure.

FIG. 1B is conceptual diagram illustrating a method of synthesizing multi-shell structure nanoparticles according to an example embodiment of the present disclosure.

FIG. 1C is conceptual diagram illustrating a method of synthesizing multi-shell structure nanoparticles according to an example embodiment of the present disclosure.

FIG. 1D is conceptual diagram illustrating a method of synthesizing multi-shell structure nanoparticles according to an example embodiment of the present disclosure.

FIG. 1E is conceptual diagram illustrating a method of synthesizing multi-shell structure nanoparticles according to an example embodiment of the present disclosure.

FIG. 1F is conceptual diagram illustrating a method of synthesizing multi-shell structure nanoparticles according to an example embodiment of the present disclosure.

FIG. 1G is conceptual diagram illustrating a method of synthesizing multi-shell structure nanoparticles according to an example embodiment of the present disclosure.

FIG. 1H is conceptual diagram illustrating a method of synthesizing multi-shell structure nanoparticles according to an example embodiment of the present disclosure.

FIG. 1I is conceptual diagram illustrating a method of synthesizing multi-shell structure nanoparticles according to an example embodiment of the present disclosure.

FIG. 1J is conceptual diagram illustrating a method of synthesizing multi-shell structure nanoparticles according to an example embodiment of the present disclosure.

FIG. 1K is conceptual diagram illustrating a method of synthesizing multi-shell structure nanoparticles according to an example embodiment of the present disclosure.

FIG. 2A is conceptual diagram illustrating a method of fabricating an electrode of a supercapacitor according to another example embodiment of the present disclosure.

FIG. 2B is conceptual diagram illustrating a method of fabricating an electrode of a supercapacitor according to another example embodiment of the present disclosure.

DETAILED DESCRIPTION

Figure 1A:
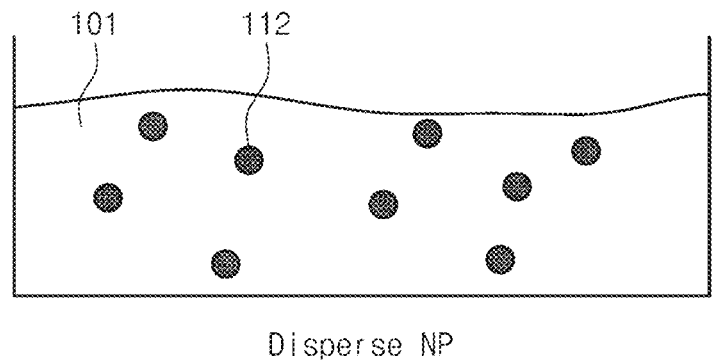
FIGS. 1A to 1K are conceptual diagram illustrating a method of synthesizing multi-shell structure nanoparticles according to an example embodiment of the present disclosure.

Core-shell nanostructures of metal oxide and carbon-based materials have been attractive as excellent electrode materials for supercapacitors and batteries. However, synthesis of core-shell nanoparticles requires a complicated procedure in which high cost and long processing time are required. In the present disclosure, we have synthesized triple core/shell nanoparticles of TiO$_2$@MnO$_2$@C using structure-guided combustion waves (SGCWs) resulting from incomplete combustion inside a nanostructure packed with chemical fuels. We propose a new method. Triple core/shell nanoparticles synthesized by the new method may used as a supercapacitor electrode. Structure-guided combustion waves transform TiO$_2$ into TiO$_2$@C and TiO$_2$@MnO$_2$ into TiO$_2$@MnO$_2$@C through incomplete combusted carbonaceous fuels. A synthesized carbon film serves as a template for a MnO$_2$ shell in TiO$_2$@C and serves as a template for organic shells of TiO$_2$@MnO$_2$@C. A TiO$_2$@MnO$_2$@C-based electrode exhibits higher specific capacitance (488 F/g at 5 m/V) and capacitance retention (98.7 @ at 1.0 A/g after 3000 cycles) than the absence of MnO$_2$. In the case of absence of MnO$_2$ and carbon shell, specific capacitance and capacitance retention exhibit serious characteristic degradation. Core TiO$_2$ nanoparticles and a carbon shell prevent the internal and external transformation of the MnO$_2$ shell. Thus, the nanostructure of TiO$_2$@MnO$_2$ may be retained well in spite of long-term cycling to provide excellent performance. Preparation of nanoparticles using a porous fuel membrane and structure-guided combustion waves may provide synthesis of a multi-core/shell structure that suppresses aggregation and is applicable to various electrochemical applications.

Electrochemical energy conversion and storage are essential to satisfy an increasing demand for small-sized and large-sized mobile platforms such as Internet-of-Things (IoT), mobile electronic devices, and electric vehicles. In particular, supercapacitors are being spotlighted due to advantages thereof such as high capacity and power density, quick charge-discharge time, long cycle life, and eco-friendliness. However, low energy density and material processing costs remain a challenge.

In the 1970s, researches into carbon-based materials were conducted for electrodes of electrostatic double-layer capacitance (EDLC) in which two electrodes transport different charges through attachment of ions and carriers at a boundary between an electrolyte and an electrode. Electrostatic double-layer capacitance has a long cycle life but low capacity and power density. Researches into pseudo-capacitors depending on electron charge transfer induced by electrosorption, redox reaction, and intercalation have been extensively conducted since the 1980s. Capacitance of the pseudo capacitor was improved using various combinations of metal oxides and conductive polymers. However, short cycle life caused by physical chemical degradation should be solved according to actual demand. As an alternative, various researches into the development of hybrid micro-nanostructure composites of metal oxides and carbon-based materials have intensively conducted to utilize pseudo-capacitors as supercapacitors and EDLC. Since a manganese oxide theoretically exhibits high specific capacitance, the manganese oxide is a strong candidate for an electrode material of a supercapacitor. In addition, manganese oxides are abundant in nature and are available at low cost. Various types of MnO$_2$ nanostructure have been researched as candidates for high performance supercapacitors such as wires, tubes, spheres, and hybrids thereof. However, the micro-nanostructured $MnO_2$ has low electrical conductivity and structural stability problems that degrade performance and thermochemical physical cycle stability during long-term operation.

Accordingly, researches into other metal oxides providing excellent stability have also been conducted. For example, titanium dioxide ($TiO_2$) has excellent thermal-structural stability even at high temperatures and exhibits excellent resistance against rapid changes in high chemical and physical environments. However, the theoretical specific capacitance of $TiO_2$ is lower than those of other metal oxides. Accordingly, hybrid materials of $TiO_2$ and other metal oxides having high specific capacitance such as $MnO_2$, $RuO_2$, and $Co_3O_4$ have been researched to improve two types of performance. On the other hand, an increase in electrical conductivity between an electrode and an electrolyte is an important issue in electrodes based on metal oxide. Carbon-based materials around metal oxides are being spotlighted as electrically conductive layers. In addition, carbon-based materials may prevent changes in physical and chemical characteristics of metal oxides. The changes in physical and chemical characteristics of metal oxides may result in performance degradation. In particular, hybrids between metal oxide, activated carbon, carbon nanotubes, and graphene are developed to achieve the above functions.

Synthesis of hybrid nanostructures of metal oxides and carbon-based materials may be performed using various methods such as thermal decomposition of organometallic compounds, sol-gel method, chemical vapor deposition, pyrolysis, and hydrothermal method. A hydrothermal process and following calcination methods are used to synthesize core-shell structures of metal oxides or alloys from nitrates, carbonates, hydroxides or precursors. However, it takes a long time for them to evaporate a precursor-containing aqueous solution and an additional calcination process is required under a certain environmental condition such as argon atmosphere in a high-temperature environment. A multi-step process and a large-sized apparatus providing a special environment inevitably cause high cost and long time processing. Moreover, active materials are exposed to high temperatures during a manufacturing process such as hydrothermal reaction and pyrolysis of polymer, and transition or degradation of intrinsic micro-nanostructure occurs. For example, since stability of $MnO_2$ is low at 500 degrees Celsius or higher, serious aggregation and phase transformation occur in synthesizing processes including annealing. A surface area may be reduced by the aggregation to reduce an active surface area. Accordingly, there is a need for manufacturing of a multi-core/shell structure including a metal oxide and a carbon-based material which may be applied to a supercapacitor electrode to improve stability and capacitance.

Nanoparticles of a multi-core/shell structure according to an example embodiment of the present disclosure may be used in electrodes of a battery or a supercapacitor by applying conductivity of a carbon film and a core/shell structure to improve electrical characteristics. Non-aggregated nanoparticles may stably trap materials inside the carbon film through carbon coating having high chemical and mechanical stability. Accordingly, the non-aggregated nanoparticles may be applied to a drug delivery bag or a nano-sized catalytic material as well as a battery electrode suffering from degradation.

According to an example embodiment of the present disclosure, a structure-guided combustion waves technique may replace a conventional complicated carbon film deposition process such as chemical vapor deposition (CVD) and pyrolysis of an inorganic material such as polymer.

In a method of preparing nanoparticles of a multi-core/shell structure according to an example embodiment of the present disclosure, the nanoparticles may be dispersed to prevent aggregation thereof using a porous fuel membrane. The porous fuel membrane may be combusted using combustion waves to coat a carbon film only on the nanoparticles. The coating may be performed by replacing the carbon film with another metal oxide using a redox reaction, dispersing nanoparticles using a porous fuel membrane to prevent aggregation of the nanoparticle, and combusting the porous fuel membrane using combustion waves to coat the carbon film on the nanoparticles. As a result, nanoparticles having a plurality of shells may be prepared.

Example embodiments of the present disclosure will now be described below more fully with reference to accompanying drawings. The present disclosure may, however, be embodied in different forms and should not be constructed as limited to the embodiments set forth herein. Rather, these embodiments are provided so that this disclosure will be thorough and complete, and will fully convey the scope of the present invention to those skilled in the art.

FIGS. 1A to 1K are conceptual diagram illustrating a method of synthesizing multi-shell structure nanoparticles according to an example embodiment of the present disclosure.

Referring to FIGS. 1A to 1K, a method of synthesizing multi-shell structure nanoparticles 110 includes uniformly distributing core nanoparticles 112 to a first porous fuel membrane 120, coating the core nanoparticles 112 fixed to the first porous fuel membrane 120 with a fuel 113, combusting the fuel 113 coated on the core nanoparticles 112 and the first porous fuel membrane 120 to coat a first carbon film 114 on surfaces of the core nanoparticles 112, replacing the first carbon film 114 with a metal oxide layer 115 using a redox reaction to prepare preliminary nanoparticles 110a, uniformly distributing the preliminary nanoparticles 110a to a second porous fuel membrane 140, coating the preliminary nanoparticles 110a fixed to the second porous fuel membrane 140 with a fuel 117, and combusting the fuel 117 coated on the preliminary nanoparticles 110a and the second porous fuel membrane 140 to coat the second carbon film 118 on surfaces of the preliminary nanoparticle 110a.

The core nanoparticle 112 may be a metal particle or a metal-alloy particle including at least one copper (Cu), silver (Ag), gold (Au), nickel (Ni), and aluminum (Al), or a metal oxide particle including at least one of $SiO_2$, $Al_2O_3$, $ZrO_3$, and $TiO_2$. The core nanoparticle 112 may be a material having conductivity or a thermally and mechanically stable material. The core nanoparticle 112 has a diameter of several nanometers (nm) to several tens of nanometers (nm).

Figure 1B:
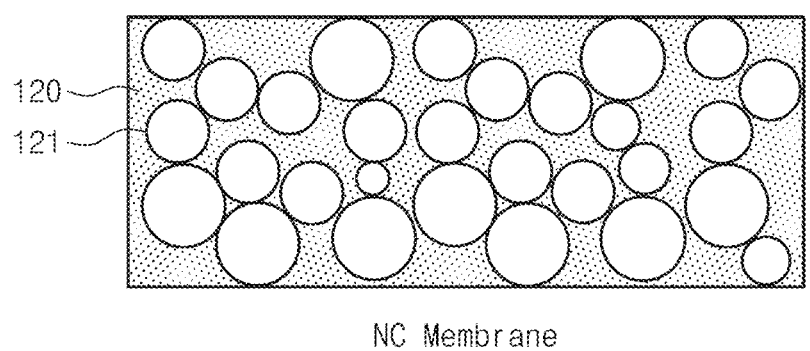
Figure 1C:
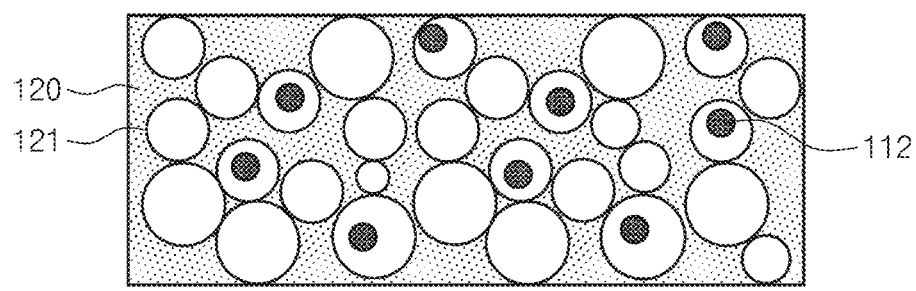

Referring to FIGS. 1A to 1C, the uniformly distributing core nanoparticles 112 to a first porous fuel membrane 120 includes mixing the core nanoparticles 112 with deionized water (DI water) 101 and dispersing the mixture using a sonicator, uniformly distributing the core nanoparticles 112 to the first porous fuel membrane 120 using vacuum filtration, and drying the core nanoparticle/porous fuel membrane structure.

The first porous fuel membrane 120 may be a nitrocellulose membrane. The first porous fuel membrane 120 may have a pore 121, and the pore 121 may have a size of several tens to several hundreds of nanometers (nm). Specifically, the pore 121 may have a size of 0.1 micrometer (μm).

Figure 1D:
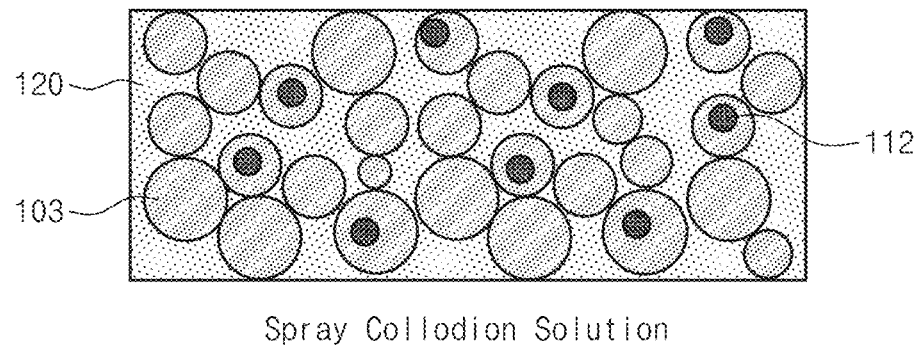
Figure 1E:
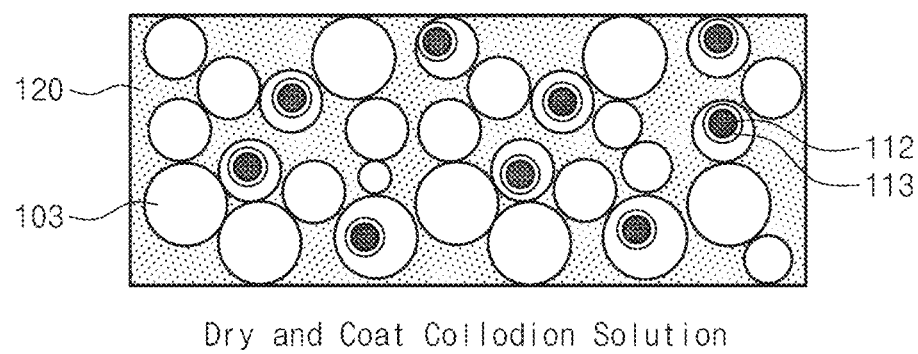

Referring to FIGS. 1D and 1E, the coating the core nanoparticles 112 fixed to the first porous fuel membrane 120 with a fuel 113 may include spraying a collodion solution 103, in which a fuel is dissolved in an organic solve, onto the first porous fuel membrane 120 and drying the sprayed collodion solution 103. The fuel may be nitrocellulose, a chemical fuel containing a nitro group, or a combustible organic matter. The organic solvent may be a solvent in which ethanol and diethyl ether are mixed at a ratio of 3 to 1 (3:1). The collodion solution 103, in which 5 weight percent (wt %) of nitrocellulose is dissolved in the organic solvent, is sprayed onto the first porous fuel membrane 120, and then dried.

Figure 1F:
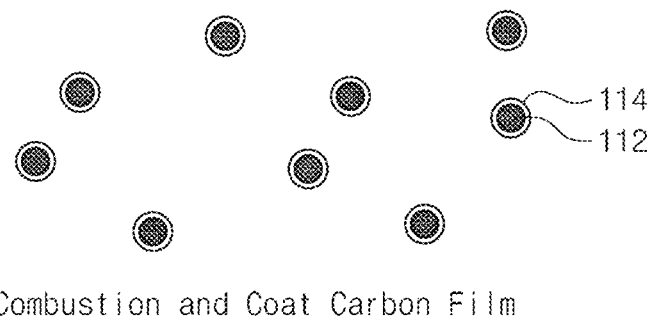

Referring to FIG. 1F, the combusting the fuel 113 coated on the core nanoparticles 112 and the first porous fuel membrane 120 to coat a first carbon film 114 on surfaces of the core nanoparticles 112 includes igniting the fuel 113 and the first porous fuel membrane using laser heating or Joule heating to coat a first carbon film 114 on the surfaces of the core nanoparticles by self-propagation combustion waves. The combustion of the fuel 113 and the first porous fuel membrane 120 may be performed in the atmosphere. In this case, the first carbon film 114 may have a thickness of several nanometers (nm) to several tens of nanometers (nm). The greater the amount of oxygen under combustion atmosphere, the less a thickness of the first carbon film 114. Accordingly, the combustion may be performed while an inert gas such as argon is added to the atmosphere to increase the thickness of the first carbon film 114. As a result, the nanoparticles coated with the first carbon film 114 may be separated from each other without being aggregated.

Figure 1G:
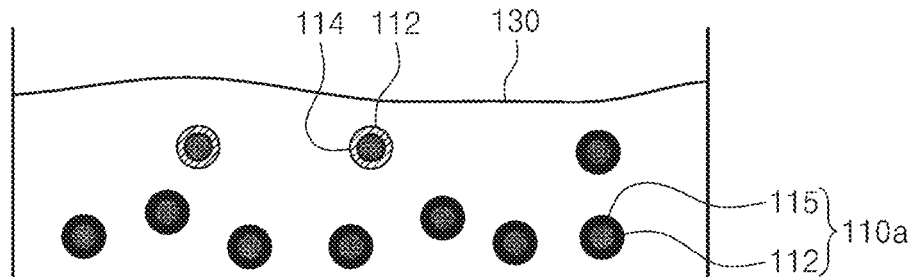
Figure 1H:
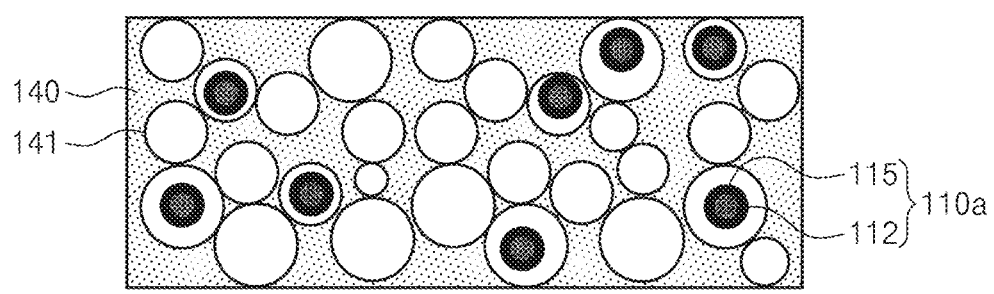

Referring to FIGS. 1G and 1H, the first carbon film 114 may be replaced with the metal oxide layer 115 using a redox reaction to prepare preliminary nanoparticles 110a. The metal oxide layer 115 may include at least one of $MnO_2$ and $RuO_2$. In the case in which the metal oxide layer 115 is manganese dioxide, the core nanoparticles 112 coated with the first carbon film 114 are dipped in an aqueous solution 130 of $KMnO_4$ to reduce the first carbon film 114 into the metal oxide layer 115 by a reduction/oxidation (redox) reaction of $KMnO_4$ and carbon. In the case in which the metal oxide layer 115 is $RuO_2$, the core nanoparticles 112 coated with the first carbon film 114 are dipped in an aqueous solution of $KRuO_4$ to reduce the first carbon film into the metal oxide layer 115 by a redox reaction of $KRuO_4$ and carbon. Thus, preliminary nanoparticles 110a may be prepared.

Referring to FIG. 1H, the uniformly distributing the preliminary nanoparticles 110a to a second porous fuel membrane 140 includes mixing the preliminary nanoparticles 110a with deionized water and dispersing the mixture using a sonicator, uniformly distributing the preliminary nanoparticles 110a to the second porous fuel membrane 140 using vacuum filtration, and drying the preliminary nanoparticle/second porous fuel membrane structure.

The second porous fuel membrane 140 may be a nitrocellulose membrane. The second porous fuel membrane 140 may have a pore 141 and may have a size of several tens to several hundreds of nanometers (mm). Specifically, the pore 141 may have a size of 0.1 µm.

Figure 1I:
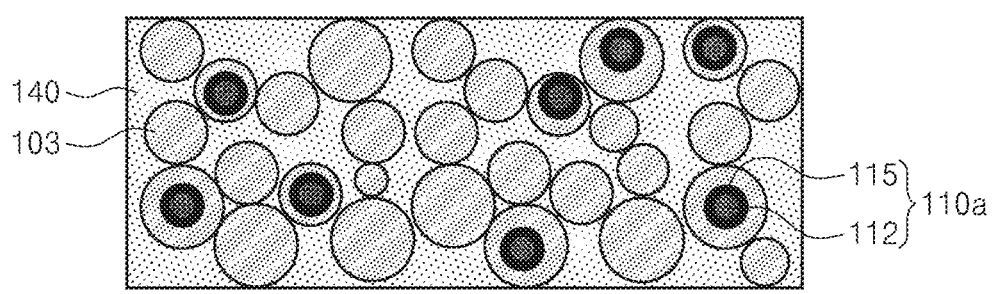
Figure 1J:
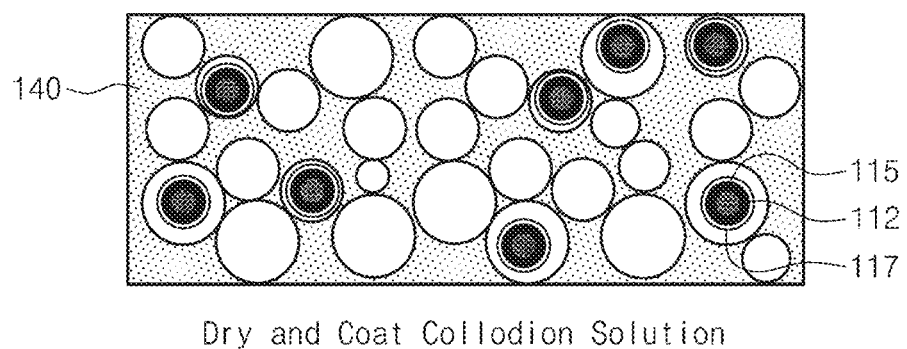
Figure 1K:
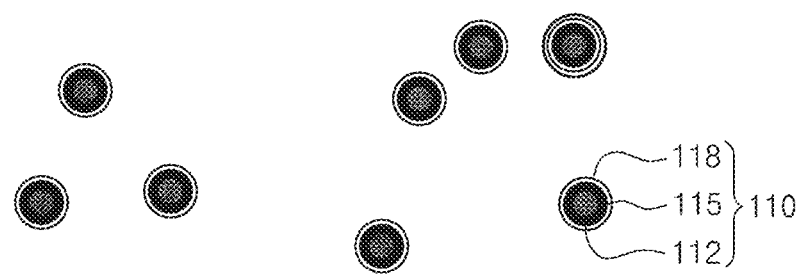

Referring to FIGS. 1I to 1K, the coating the preliminary nanoparticles 110a fixed to the second porous fuel membrane 140 with a fuel 117 may include spraying the collodion solution 103, in which a fuel is dissolved in an organic solvent, onto the second porous fuel membrane 140 and drying the sprayed collodion solution 103. The fuel 117 may be nitrocellulose, a chemical group containing a nitro group, or a combustible organic matter. The organic solvent may be a solvent in which ethanol and diethyl ether are mixed at a ratio of three to one (3:1). A colloid solution, in which 5 weight percent (wt %) of nitrocellulose is dissolved in the organic solvent, is sprayed onto the second porous fuel membrane, and then dried.

The combusting the fuel 117 coated on the preliminary nanoparticles 110a and the second porous fuel membrane 140 to coat the second carbon film 118 on surfaces of the preliminary nanoparticle 110a may include igniting the fuel 117 and the second porous fuel membrane 140 using laser heating or Joule heating to coat the second carbon film 118 on the surfaces of the preliminary nanoparticles 110a by self-propagation combustion waves.

In this case, the second carbon film 118 may have a thickness of several nanometers (nm) to several tens of nanometers (nm). The greater the amount of oxygen in a combustion atmosphere, the less the thickness of the second carbon film 118. Accordingly, the combustion may be performed while an inert gas such as argon is added to the atmosphere to increase the thickness of the second carbon film 118. As a result, the nanoparticles coated with the second carbon film 118 may be separated from each other without being aggregated.

Figure 2A:
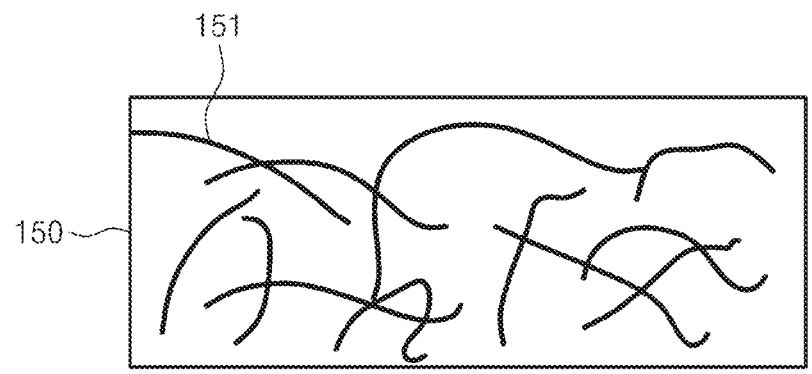
FIGS. 2A and 2B are conceptual diagram illustrating a method of fabricating an electrode of a supercapacitor according to another example embodiment of the present disclosure.
Figure 2B:
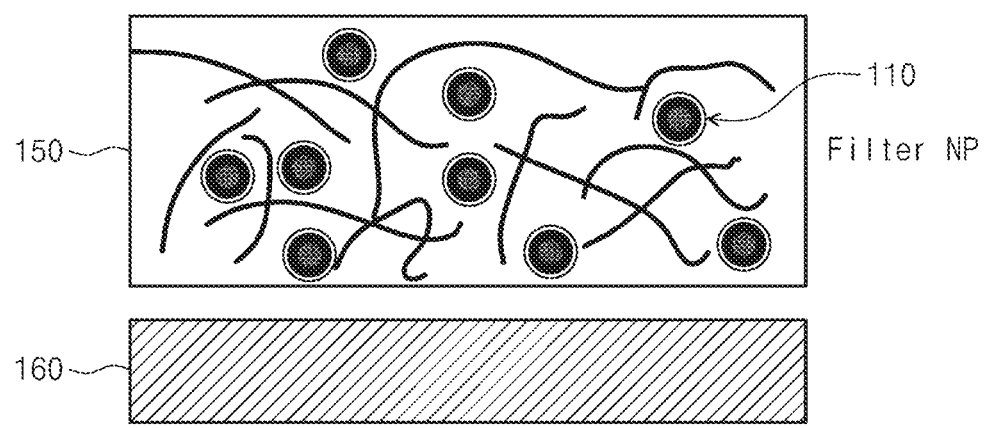

FIGS. 2A and 2B are conceptual diagram illustrating a method of fabricating an electrode of a supercapacitor according to another example embodiment of the present disclosure.

Referring to FIGS. 1A to 1K and FIGS. 2A and 2B, a method of fabricating an electrode including multi-shell structure nanoparticles 110 includes uniformly distributing core nanoparticles 112 to a first porous fuel membrane 120; coating the core nanoparticles 112 fixed to the first porous fuel membrane 120 with a fuel 113; combusting the fuel 113 coated on the core nanoparticles and the first porous fuel membrane 120 to coat the first carbon film 114 on surfaces of the core nanoparticles 112: replacing the first carbon film 114 with the metal oxide layer 115 to produce preliminary nanoparticles 110a; uniformly distributing the preliminary particles 110a to a second porous fuel membrane 140; coating the preliminary nanoparticles 110a fixed to the second porous fuel membrane 140 with a fuel 117; and combusting the fuel 117 coated on the preliminary nanoparticles and the second porous fuel membrane 140 to coat a second carbon film 118 on surfaces of the preliminary nanoparticles. Accordingly, multi-shell structure nanoparticles 110 having core/metal oxide layer/carbon film are synthesized.

The method of fabricating an electrode including multi-shell structure nanoparticles 110 may include dispersing the multi-shell structure nanoparticles in deionized water to prepare a multi-shell structure nanoparticle dispersing agent; forming a carbon nanotube film 150 by means of vacuum filtration using a carbon nanotube dispersing agent in which in which carbon nanotubes 151 are dispersed in an aqueous solution of sodium dodecyl sulfate (SDS); filtering the multi-shell structure nanoparticle dispersing agent through the carbon nanotube film 150 to adsorb the multi-shell nanoparticle 110 to the carbon nanotube film 150, and attaching the carbon nanotube film 150, to which the multi-shell structure nanoparticles 110 are adsorbed, to an electrode 160 of a supercapacitor.

The dispersing the multi-shell structure nanoparticles in deionized water to prepare a multi-shell structure nanoparticle dispersing agent includes uniformly dispersing multi-shell structure nanoparticles in deionized water at a concentration of 50 mg/mL using a sonicator.

Referring to FIG. 2A, the forming a carbon nanotube film 150 by means of vacuum filtration using a carbon nanotube dispersing agent in which in which carbon nanotubes 151 are dispersed in an aqueous solution of sodium dodecyl sulfate (SDS) may include forming a carbon nanotube dispersing agent, in which carbon nanotubes (CNT) are dispersed in an aqueous solution of 2.0 weight percent (wt %) of sodium dodecyl sulfate (SDS) by 0.1 wt %, into 10 mg of a carbon nanotube film by means of vacuum filtration. The carbon nanotubes 151 may be multi-walled carbon nanotubes (MWCNTs). The carbon nanotubes 151 may have a length of 5 micrometers (μm) to 20 μm and an external diameter of 20 nanometers (nm) to 40 nm. Referring to FIG. 2B, a multi-shell structure nanoparticle dispersing agent is filtered through the carbon nanotube film 150 to adsorb the multi-shell structure nanoparticles 100 to the carbon nanotube film 150. The multi-shell structure nanoparticles may be adsorbed to the carbon nanotube film 150 by filtering about 2 mg of the multi-shell structure nanoparticle dispersing agent. The carbon nanotube film 150 may be dried after filtering the deionized water several times to remove sodium dodecyl sulfate and impurities.

The carbon nanotube film 150, to which the multi-shell structure nanoparticles 150 are adsorbed, may be attached to an electrode 160 of a supercapacitor or may be used independently as an electrode.

FIGS. 3, 4A, 4B, and 4C are a conceptual diagram illustrating a method of synthesizing multi-shell structure nanoparticles according to another example embodiment of the present disclosure and images showing a combustion state, respectively.

Figure 3:
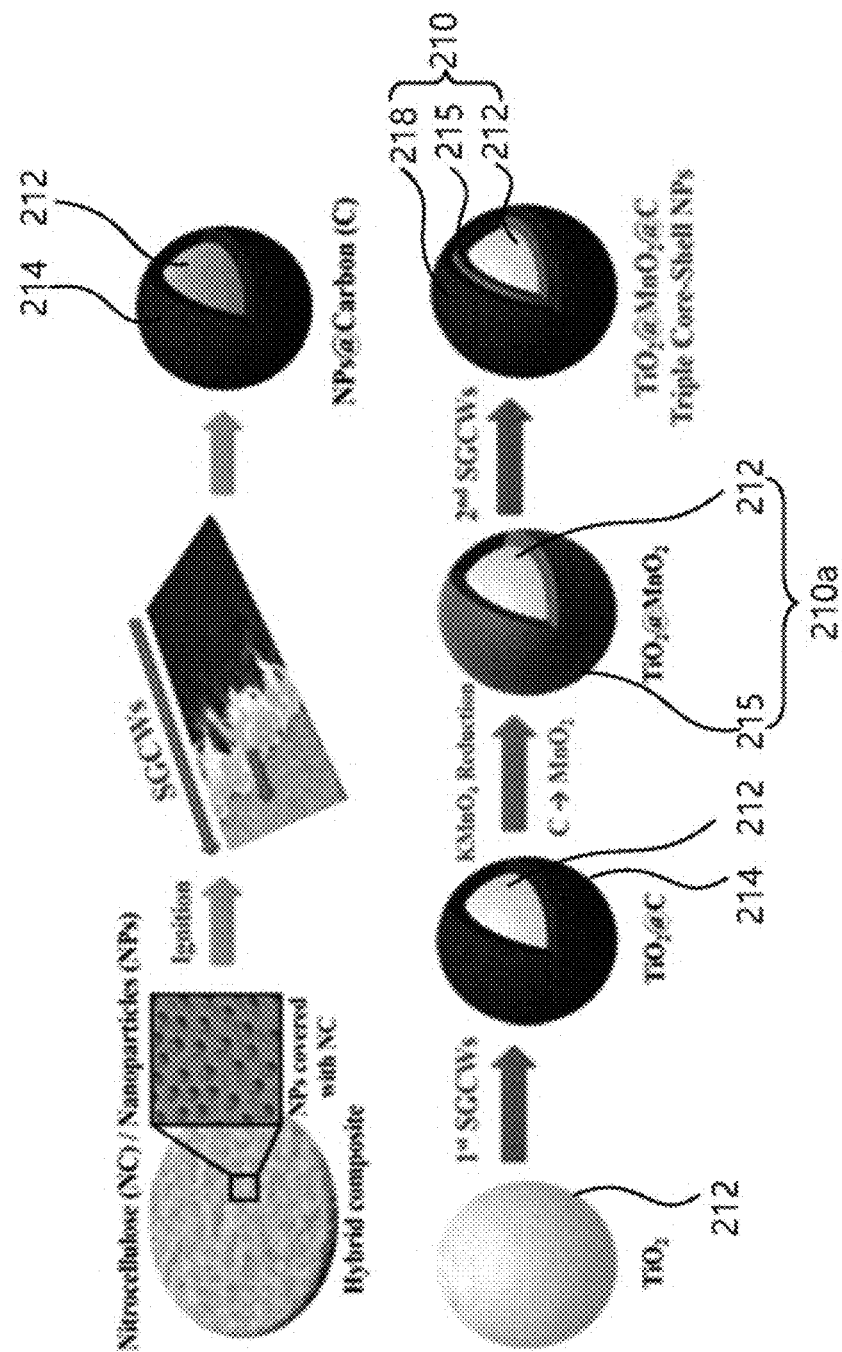
FIG. 3 is a conceptual diagram illustrating a method of synthesizing multi-shell structure nanoparticles according to another example embodiment of the present disclosure.
Figure 4A:
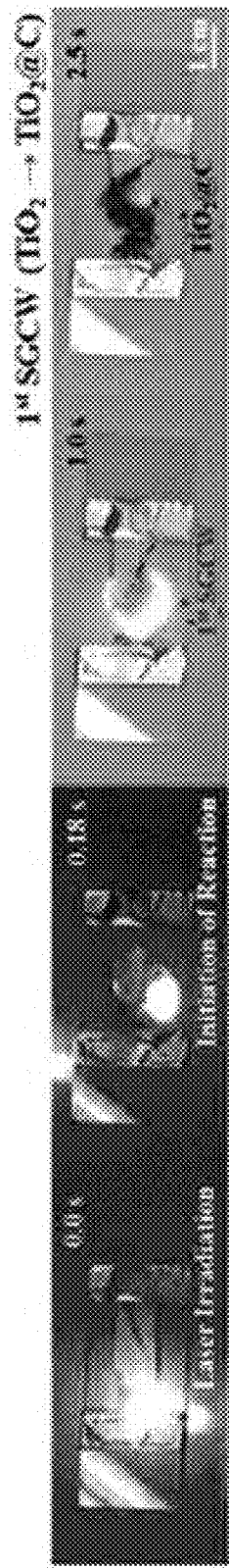
FIG. 4A is images of 1 structure-guided combustion waves (SGCWs) propagating through $TiO_2$ nano-particles/nitrocellulose hybrid composites according to another example embodiment of the present disclosure.
Figure 4B:
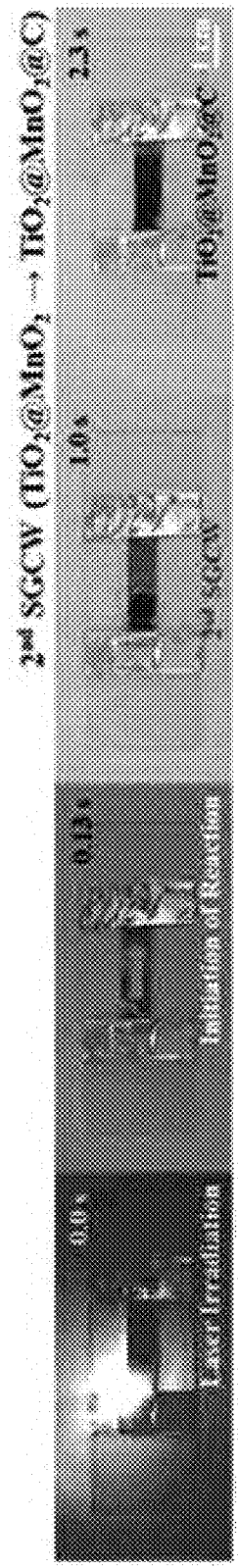
FIG. 4B is images of 2nd structure-guided combustion waves (SGCW) propagating through $TiO_2$@$MnO_2$/nitrocellulose hybrid composites according to another example embodiment of the present disclosure.
Figure 4C:
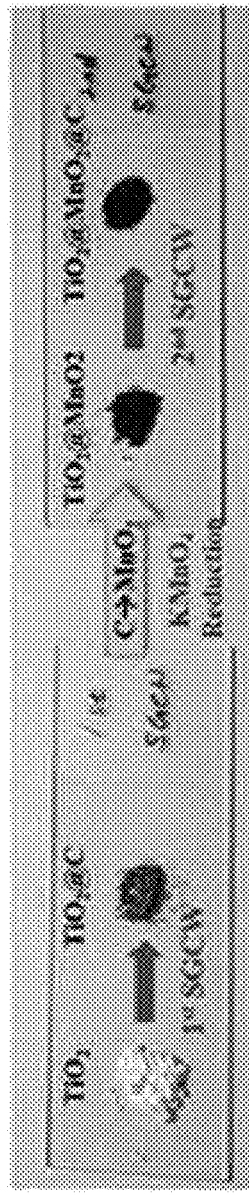
FIG. 4C is images of step-by-step synthesized nanomaterials.

Referring to FIGS. 3 and 4C, $TiO_2@MnO_2@C$ nanoparticles 210 are designed to incorporate advantages of $TiO_2$, $MnO_2$ and carbon into both a synthesis process and a material of a supercapacitor electrode. A stable core-$TiO_2$ nanoparticles 112 prevents not only aggregation a $MnO_2$ shell 215 when receiving a high temperature of a structure-guided combustion wave process but also transformation of the $MnO_2$ shell 215 of the supercapacitor electrode during a long-term charge-discharge cycle. The $MnO_2$ shell 215 serves as a pseudo-capacitive material for high specific capacitance. A first carbon film 214 caused by a first structure-guided combustion process is consumed as a template layer for the $MnO_2$ shell 215 and an outermost second carbon film 218 of the $TiO_2@MnO_2@C$ caused by a second structure-guided combustion wave process improves physical and chemical stability and electrical conductivity of the $MnO_2$ shell 215.

A titanium dioxide was used as core nanoparticles 212. The titanium dioxide may be anatase phase $TiO_2$ and may have a diameter less than 25 nm. The core nanoparticles 215 are uniformly dispersed in deionized water at a concentration of 5 mg/mL using a sonicator. The dispersed core nanoparticles are uniformly distributed in a nitrocellulose membrane (diameter: 47 mm, pore size: 0.1 μm) through a vacuum filtration process on the nitrocellulose membrane. The core nanoparticle/membrane structure is dried at room temperature for several hours. A colloid solution containing 5 wt % of nitrocellulose in an organic solvent, in which ethanol and diethyl ether are mixed at a ratio of three to one (3:1), is sprayed onto the nitrocellulose membrane, and then dried. When the organic solvent is evaporated and is completely dried, a mixture of nitrocellulose/core nanoparticles is formed.

Specifically, titanium dioxide ($TiO_2$) core nanoparticles 212 are vacuum-filtered in a first porous fuel membrane after being dispersed in deionized water by an ultrasonic treatment. A collodion solution penetrates a porous network of the first porous fuel membrane. Evaporation of an organic solvent may prepare a hybrid composite of $TiO_2$ nanoparticles and nitrocellulose membranes as a core nanostructure and a chemical fuel.

Through the above process, homogeneous coating of nitrocellulose surrounding the $TiO_2$ nanoparticles 212 is obtained. An interfacial boundary between core a nanostructure and a chemical fuel was formed in the hybrid composite. To synthesize a carbon coating film, an entire surface of the $TiO_2$ nanoparticle 212 should be covered with nitrocellulose in a collodion and the nitrocellulose membrane should be placed on a bottom surface of the hydro composite. Capillary force of the organic solvent in the colloid may promote the penetration of the fuel through the porous network.

Stepwise synthesis of $TiO_2@C$, $TiO_2@MnO_2$, and $TiO_2@MnO_2@C$ will be described in FIG. 3. Referring to FIG. 4A, first, a structure-guided combustion wave process for deposition of a carbon template was applied to the hybrid complex of the $TiO_2$ nanoparticles 212 and nitrocellulose.

Ignition of the structure-based combustion process for the $TiO_2$ nanoparticles 212 is induced by laser irradiation at one end of a hybrid composite material. At the same time, a high-speed microscope records the propagation of structure-guided combustion waves is recorded to determine a reaction speed. Since an interfacial layer of the chemical fuel was connected, the ignition of the nitrocellulose evolved to self-propagating reaction waves along the porous network of the $TiO_2$ nanoparticles 212 without providing additional thermal energy. The reaction rate of the first structure-guide combustion waves is about 1 cm/s, which enables extendable processing in an atmospheric environment. When the first structure-guided combustion waves come to an end, white color of the $TiO_2$ nanoparticles turns into black, corresponding to $TiO_2@C$ due to the deposition of the first carbon film 214 induced by the incomplete combustion of the carbonaceous fuel.

Second, $TiO_2@C$ nanoparticles were dipped in 0.1M $KMnO_4$ aqueous solution for several hours to several tens of hours until $KMnO_4$ was reduced to $MnO_2$ to replace the first carbon film 214 with $MnO_2$. The replacement of the first carbon film 214 by a $MnO_2$ shell is shown by a chemical reaction, as follows:

$$4MnO_4^- + 3C + H_2O \rightarrow 4MnO_2 + 2HCO_3^- + CO_3^{2-}$$

The first carbon film 214 of the $TiO_2@C$ nanostructure is dipped in a $KMnO_4$ solution and undergoes a redox reaction to be a $CO_3^-$ ion. In addition, four $MnO_4$-ions from $KMnO_4$ are reduced to $MnO_2$. This reaction forms core-shell $TiO_2@MnO_2$ nanoparticles, and the first core film 214 synthesized by structure-guided combustion waves serves as sacrificial templates.

Referring to FIG. 4B, third, second structure-guided combustion waves for the deposition of the second carbon film 218 surrounding the $TiO_2@MnO_2$ nanoparticles are applied to the hybrid composite of $TiO_2@MnO_2$ nanoparticles and nitrocellulose. The structure-guided combustion waves induced by laser irradiation propagate stably along a porous network of the nitrocellulose. A reaction rate and an overall trend are nearly identical to those of the first structure-guided combustion waves. Once again, incomplete combustion of the chemical fuel layer induces deposition of the second carbon film 218 and a generated powder includes triple-core/shell $TiO_2@MnO_2@C$ nanoparticles.

A distinct color change of the powder confirms preparation of different core-shell structures during the stepwise synthesis. The $TiO_2$ nanoparticle powder was white, which is an intrinsic color of $TiO_2$. After application of the first structure-guided combustion waves, the synthesized powder is a glossy black in which an amorphous and glassy carbon film is formed around the $TiO_2$ nanoparticles. As a result of treatment with $KMnO_4$ solution, the generated $TiO_2$@$MnO_2$ nanoparticle powder remained black but the gloss disappeared. This change results from the replacement of amorphous carbon templates with $MnO_2$ and represents a transition from nanoparticles having conductive surfaces to nanoparticles having insulated surfaces. After application of the second structure-guided combustion wave, the generated powder again shows a slight gloss indicating the presence of a tri-core/shell nanostructure of $TiO_2$@$MnO_2$@C.

Physical and Chemical Characteristics of Core-Shell Structure Synthesized Through Structure-Guided Combustion Waves Structural and chemical transitions were investigated during stepwise synthesis process to confirm a specific role of $TiO_2$ and the first carbon film 214 designed to prevent aggregation and provide a template for the $MnO_2$ shell.

FIGS. 5A, 5B, 5C, and 5D are stepwise SEM images of nanoparticles according to an example embodiment of the present disclosure.

Referring to FIGS. 5A, 5B, 5C, and 5D, stepwise morphological transitions of nanoparticles are shown.

Figure 5A:
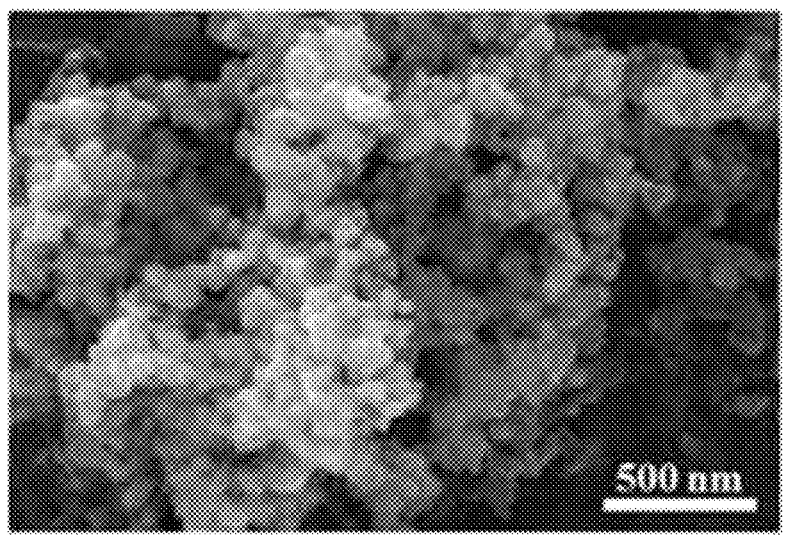
FIG. 5A is an SEM image showing steps of nanoparticles according to an example embodiment of the present disclosure before application of the first structure-guided combustion waves.

Referring to FIG. 5A, before application of the first structure-guided combustion waves, an average diameter of the prepared $TiO_2$ nanoparticles is 50 nm, a shape thereof is spherical, and a morphology thereof is slightly cube-like.

Figure 5B:
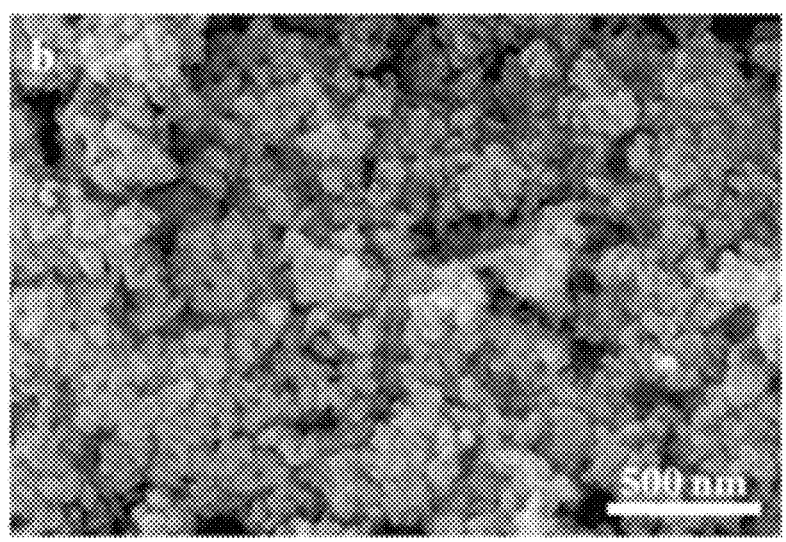
FIG. 5B is an SEM image showing steps of nanoparticles according to an example embodiment of the present disclosure after application of the first structure-guided combustion waves.

Referring to FIG. 5B, after application of the first structure-guided combustion waves, the $TiO_2$ nanoparticles having a carbon shell retain their original shape and dimensions without being aggregated. Combustion results in high-temperature condition in which severe aggregation is unavoidable, and other metal oxide nanoparticles are generally aggregated. An aggregation under the high-temperature condition reduces an exposed surface area of a porous structure to have a negative influence on an electrode. However, after application of the first structure-guided combustion waves, the $TiO_2$ particles retain their original shape and dimensions without being aggregated.

Real-time temperature changes of the hybrid composite are measured using optical pyrometers to clarify the synthesis condition. At a start point of the first structure-guided combustion waves, a temperature of a $TiO_2$ nanoparticle-based film suddenly rose to 720 degrees Celsius. However, the temperature of the $TiO_2$ nanoparticle-based film remained low at an end point of the first structure-guided combustion waves. The structure-guided combustion waves induce a temperature rise at a reaction end point within 1 second, and a reaction end point reaches 727 degrees Celsius that is a similar temperature. Simultaneously, cooling in air reduced the overall temperature at the start point. After full propagation, an entire film in the cooling step reached a room temperature within one second. In this respect, the first structure-based combustion waves form a continuous high-temperature condition in which they pass through all the $TiO_2$ nanoparticles for one second while falling and rising temperatures are rapidly completed. This is one of the significant differences from conventional annealing in a furnace, and the furnace requires a time consuming process to increase and decrease a temperature. This result demonstrates that the $TiO_2$ nanoparticles are stable enough to retain their original shape and morphology in a high-temperature environment up to 727 degrees Celsius in the first structure-guided combustion waves.

Figure 5C:
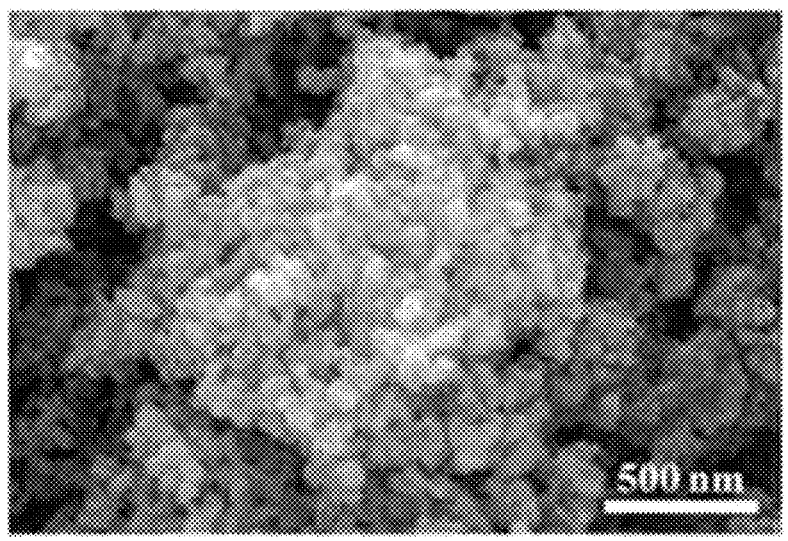
FIG. 5C is an SEM image of a core-shell structure of $TiO_2$@$MnO_2$ after the synthesis of the $MnO_2$ shell.

Referring to FIG. 5C, a core-shell structure of $TiO_2$@$MnO_2$ after the synthesis of the $MnO_2$ shell is shown on the SEM image. This process did not change an initial shape and morphology of the $TiO_2$ nanoparticles because a treatment with $KMnO_4$ solution converted the first carbon film to the $MnO_2$ shell. In addition, it is demonstrated that the synthesized $MnO_2$ surrounding the $TiO_2$ nanoparticles may be present as a thin coating on the shell.

Figure 5D:
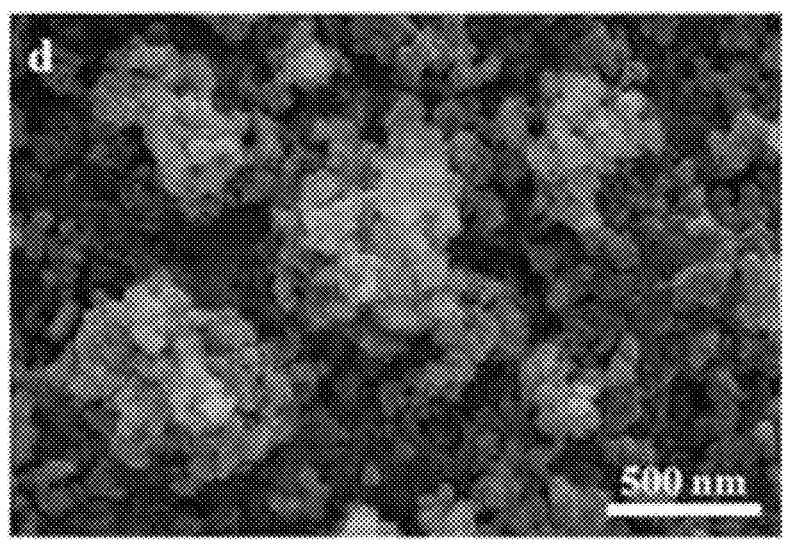
FIG. 5D is an SEM image of an ultimate product (TiO$_2$@MnO$_2$@C nanoparticles) after applying second structure-guided combustion waves to TiO$_2$@MnO$_2$ nanoparticles.

FIG. 5D shows an SEM image of an ultimate product ($TiO_2$@$MnO_2$@C nanoparticles) after applying second structure-guided combustion waves to $TiO_2$@$MnO_2$ nanoparticles.

Referring to FIG. 5D, in spite of application of sequential structure-based combustion waves and $MnO_2$ shell replacement using carbon templates, the ultimate nanoparticles still have the same shape and dimensions as original nanoparticles. A real-time temperature change of the second structure-guided combustion waves was also obtained using a photo pyrometer. The overall trend is similar to that of the first structure-guide combustion waves because the structural conditions of the fuel and the hybrid composite are the same. Additionally, instantaneous high thermal energy generated by structure-guided combustion waves induces incomplete combustion of a carbonaceous fuel due to short duration of combustion of the nanoparticles and oxygen deficiency, resulting in a rapid increase and decrease in temperature. Such a specific condition led to formation of a thin second carbon film surrounding the nanoparticles and did not affect the shape or dimensions of the ultimate nanoparticles. Since $TiO_2$ has better heat resistance than $MnO_2$ and carbon, core-$TiO_2$ nanoparticles may prevent aggregation and morphological changes during the synthesis of the triple core-shell nanostructures $TiO_2$@$MnO_2$@C.

FIGS. 6A, 6B, 7A, 7B, 7C, 7D, and 7E illustrate variation in physiochemical composition through X-ray diffraction (XRD) pattern analysis of nanoparticles according to an example embodiment of the present disclosure, Raman spectrum analysis, and X-ray photoelectron spectroscopy (XPS) analysis.

Figure 6A:
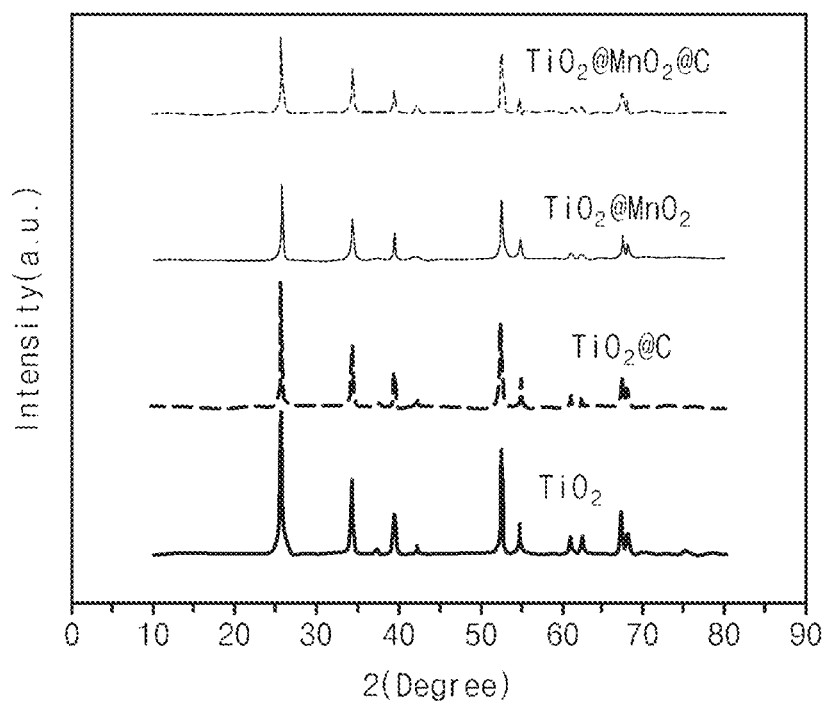
FIG. 6A shows XRD data of nanoparticles according to an example embodiment of the present disclosure.

Referring to FIG. 6A, XRD data shows that the synthesis process does not cause a significant change in a crystal structure of the core-$TiO_2$ nanoparticles. An XRD pattern of the prepared $TiO_2$ nanoparticles shows only a specific peak of the anatase structure (JCPDS No. 01-075-1537). After application of the first structure-guided combustion waves, $TiO_2$@C nanoparticles retain their original $TiO_2$ XRD peak to confirm that they may sufficiently withstand high-temperature conditions through the first structure-guided combustion waves. Although syntheses of the $MnO_2$ shell and the carbon coating were performed using a solution treatment and a second structure-guided combustion waves respectively, an intrinsic XRD peak of $TiO_2$ remained in the same position without transition of the crystal structure. Since a thin nanostructured layer did not affect the overall XRD peak, the $TiO_2$ nanoparticles may retain their original shape.

Figure 6B:
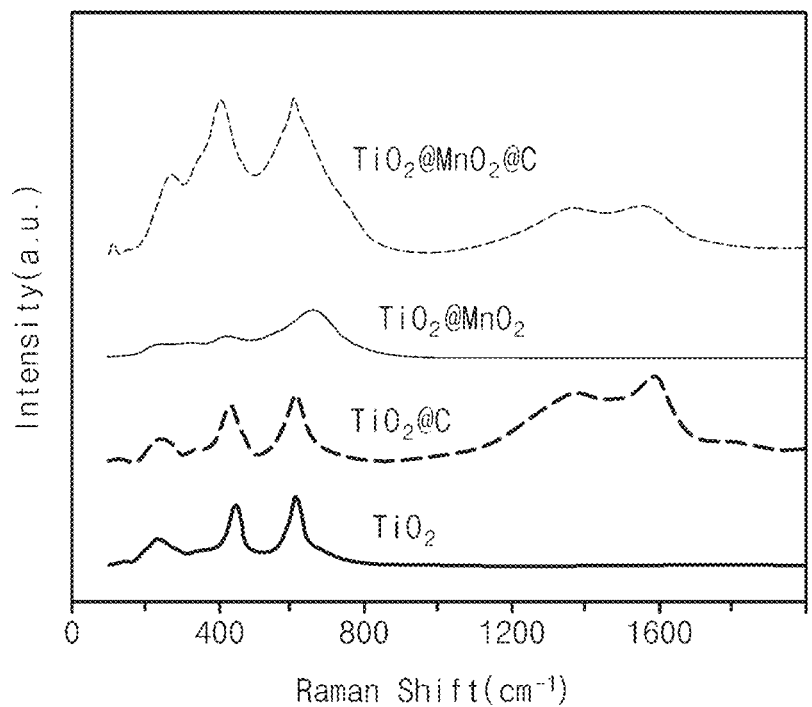
FIG. 6B shows Raman spectrum analysis of nanoparticles according to an example embodiment of the present disclosure.

Referring to FIG. 6B, the presence of a carbon shell was analyzed by Raman spectroscopy. A Raman shift peak of the $TiO_2$ nanoparticles was only observed at 445 $cm^{-1}$ and 610 $cm^{-1}$ corresponding to the $TiO_2$ anatase phase. On the other hand, nanoparticles applied with structure-guided combustion waves exhibited two additional peaks at 1370 $cm^{-1}$ and 1597 $cm^{-1}$. This may results from D and G bands of carbon. In addition, an intensity ratio of D to G ($I_D/I_G$) is 0.94 and these peaks are widely distributed in the two D and G bands. Accordingly, the Raman Peak confirmed that a new proposed material was amorphous carbon. After replacing the carbon shell with $MnO_2$, a Raman shift peak at 1370 $cm^{-1}$ and 1597 $cm^{-1}$ completely disappeared and the synthesized nanoparticles had no carbon composition. After application of the second structure-guided carbon waves, the same peak as the amorphous carbon with an intensity ratio of D to G of 0.99 emerged from the Raman spectrum.

Additionally, the presence of $MnO_2$ and surface chemical composition should be characterized to understand transition of the core-shell nanoparticles during synthesis.

Figure 7A:
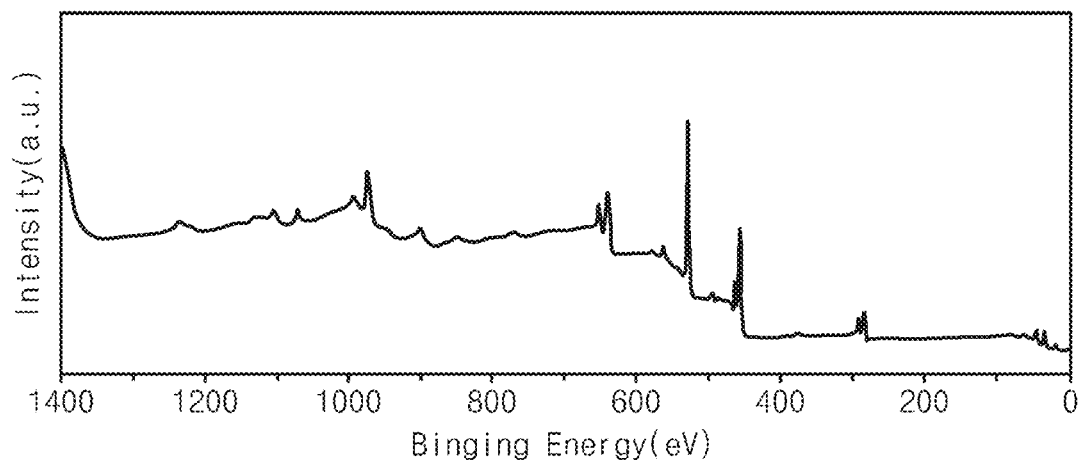
FIG. 7A shows XPS analysis of nanoparticles according to an example embodiment of the present disclosure.

Referring to FIG. 7A, XPS analysis clarified the presence of Mn, Ti, C, and O species in a survey scan of the $TiO_2@MnO_2@C$ nanostructures.

Figure 7B:
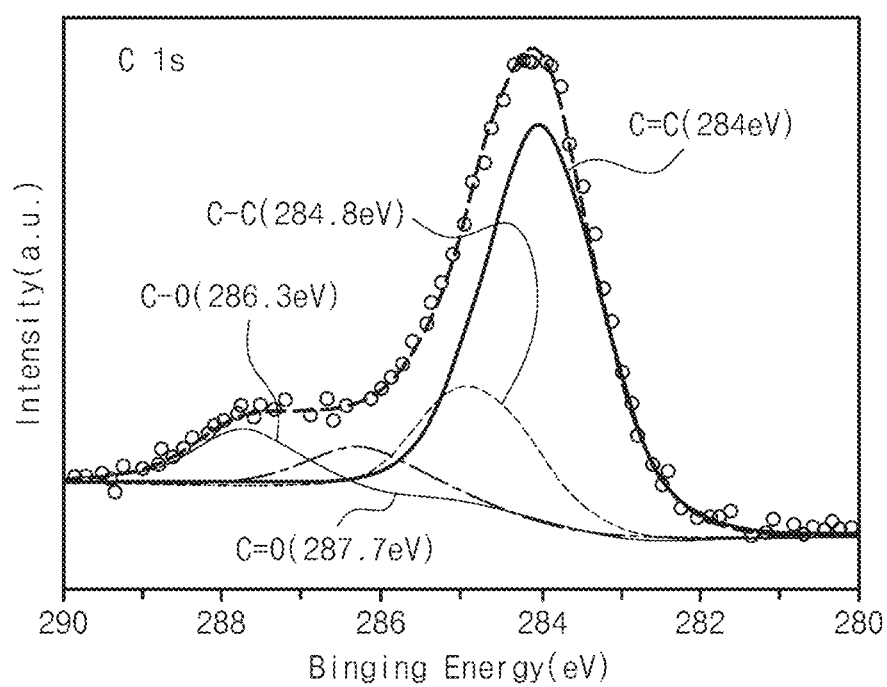
FIG. 7B shows XPS analysis of nanoparticles according to an example embodiment of the present disclosure.

Referring to FIG. 7B, a high-resolution spectrum of C 1s was decomposed into C=C, C—C, C—O and C=O components disposed at 284.0, 284.8, 286.3, and 287.7 eV. The C=C peak represents an electrically conductive $sp^2$ bond that enhances electrical conductivity of the $TiO_2@MnO_2@C$ nanostructure.

Figure 7C:
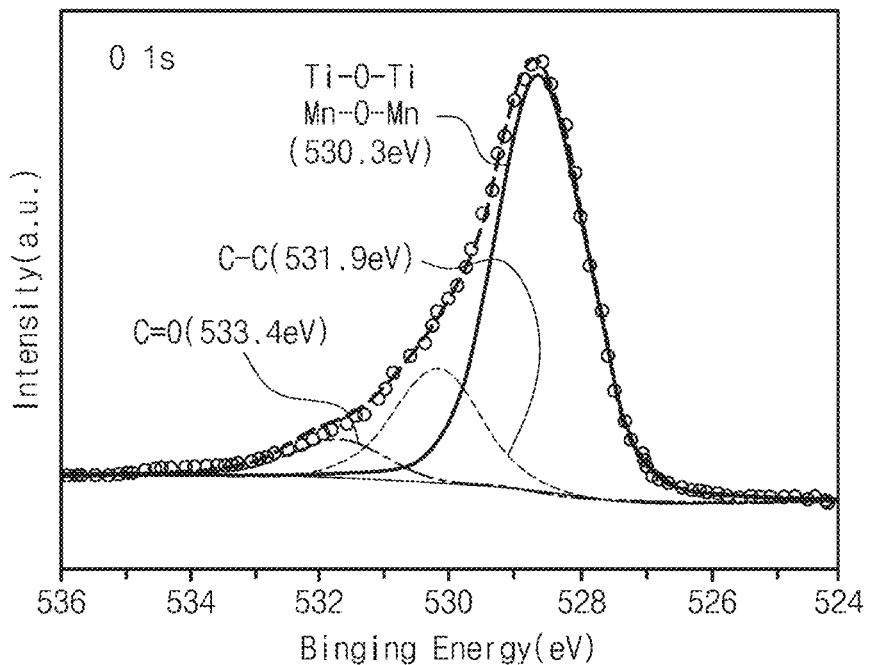
FIG. 7C shows XPS analysis of nanoparticles according to an example embodiment of the present disclosure.

Referring to FIG. 7C, a narrow scan of the O 1s spectrum was decomposed into three components disposed 530.3, 531.9, and 533.4 eV indicating metal oxide bonds of Ti—O—Ti and Mn—O—Mn, CO, and C=O, respectively. Additionally, the XPS spectrum of the treated nanoparticles clearly showed Mn $2p_{3/2}$ and Mn$2p_{1/2}$ peaks at 642.2 and 653.8 eV. This represents the synthesis of $MnO_2$.

Figure 7D:
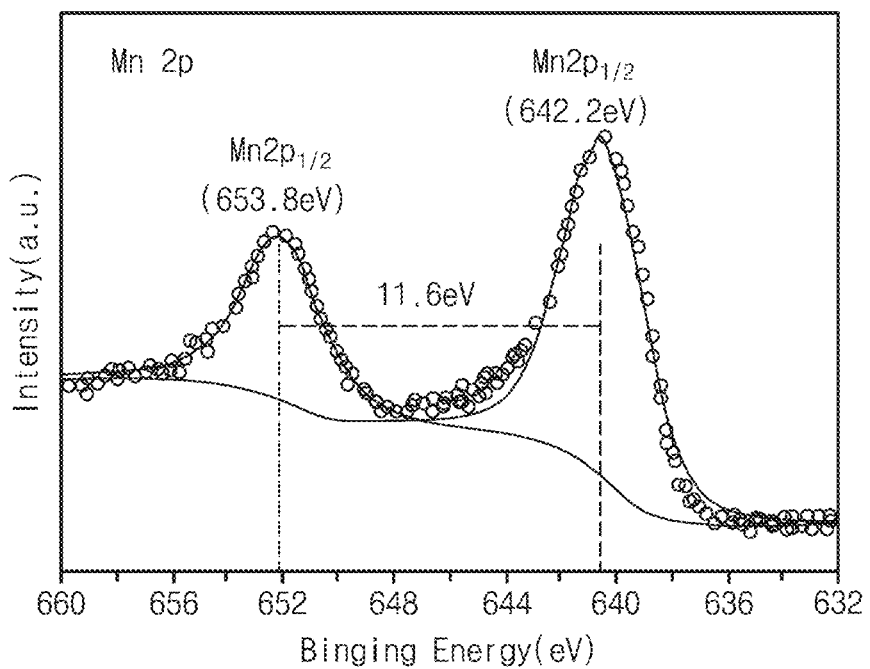
FIG. 7D shows XPS analysis of nanoparticles according to an example embodiment of the present disclosure.

Referring to FIG. 7D, spin energy separation (less than 11.6 eV) between the two peaks matches $MnO_2$.

Figure 7E:
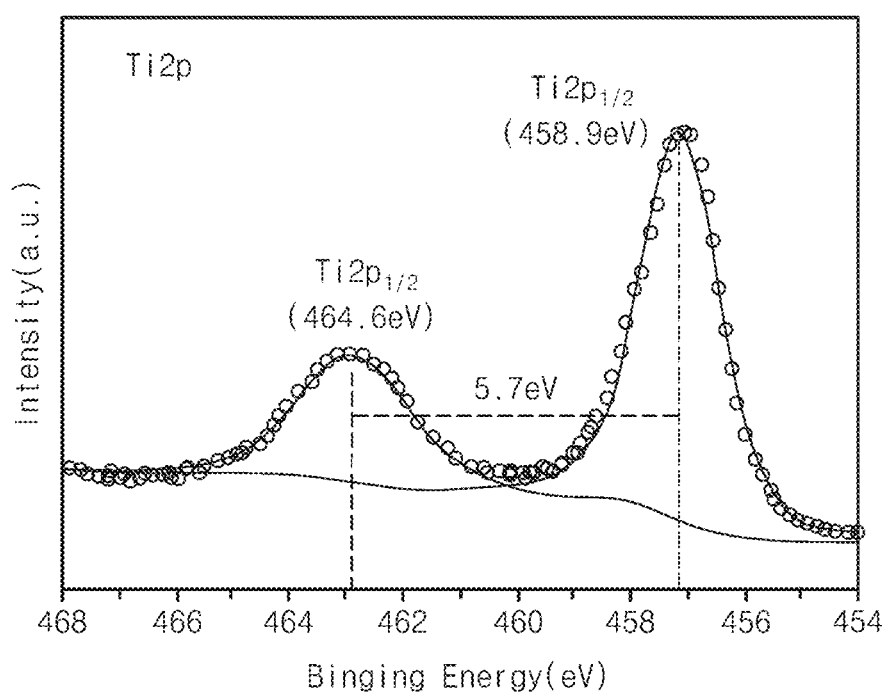
FIG. 7E shows XPS analysis of nanoparticles according to an example embodiment of the present disclosure.

Referring to FIG. 7E, a Ti 2p spectrum of the nanoparticles is decomposed into two peaks of Ti $2p_{3/2}$ (458.9 eV) and Ti $2p_{1/2}$ (464.6 eV) and the spin energy separation (less than 5.7 eV) between two peaks matches $TiO_2$.

FIGS. 8A, 8B, 8C, 8D, 8E, and 8F are image of results illustrating characteristics in $TiO_2$-based core-shell nanoparticles according to an example embodiment of the present disclosure.

Figure 8A:
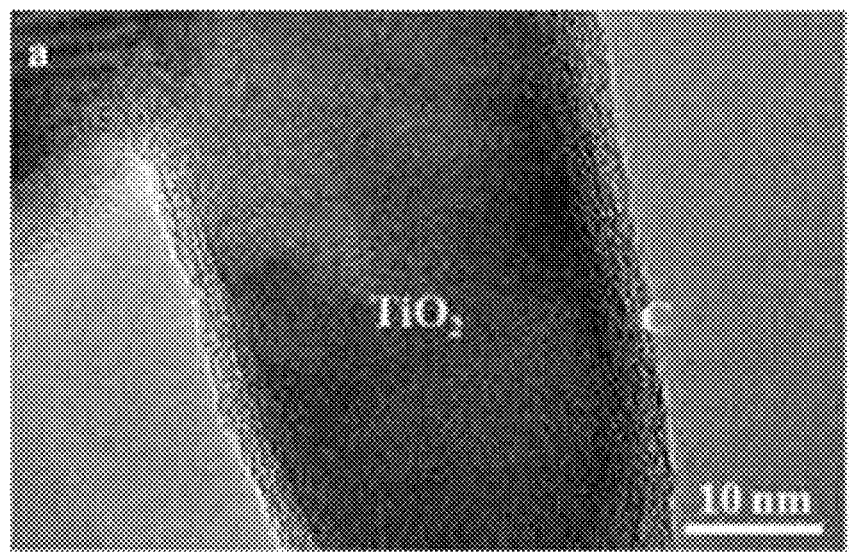
FIG. 8A shows a transmission electron microscope (TEM) image of TiO$_2$@C after application of the first structure-guided combustion waves.

FIG. 8A shows a transmission electron microscope (TEM) image of $TiO_2@C$ after application of the first structure-guided combustion waves. Characteristics in $TiO_2$-based core-shell nanoparticles were investigated in terms of physical size and detailed chemical composition. The transmission electron microscopy (TEM) images may provide physical dimensions of $TiO_2$ and carbon. Black and translucent regions correspond to the $TiO_2$ nanoparticles and the first carbon shell, respectively. After application of the first structure-guided combustion waves, a thin carbon film was clearly observed and the carbon film completely covers a periphery of the $TiO_2$ nanostructure. A thickness of the carbon film has a uniform distribution and is less than 5 nanometers (nm).

In the structure-guided combustion waves, incomplete combustion of a carbonaceous fuel may form a carbon shell in nanoparticles using a one-stop process in an open-air atmosphere. The incomplete combustion is caused by lack of oxygen at an interfacial boundary between the $TiO_2$ nanoparticles and the chemical fuel.

The formed carbon shell was consumed by a redox reaction in an aqueous solution of $KMnO_4$ to replace the $MnO_2$ shell surrounding the $TiO_2$ nanoparticles.

Figure 8B:
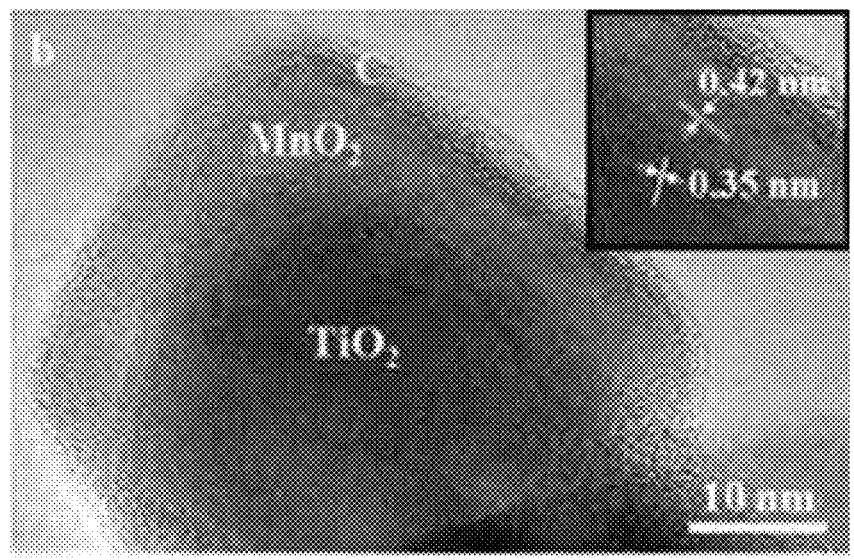
FIG. 8B is a TEM image showing a triple-shell structure of TiO$_2$@MnO$_2$@C after applying the second structure-guided combustion waves to the TiO$_2$@MnO$_2$ nanoparticles.

FIG. 8B is a TEM image showing a triple-shell structure of $TiO_2@MnO_2@C$ after applying the second structure-guided combustion waves to the $TiO_2@MnO_2$ nanoparticles. An outermost amorphous carbon shell (less than a thickness of 5 nm) is uniformly deposited on surfaces of the nanostructures while an interior thereof is a double-core/shell structure of two different materials. Lattice fringe spacings of the core and the first $MnO_2$ shell are 0.35 nm and 0.42 nm, corresponding to a (101) lattice plane of $TiO_2$ and a (110) lattice plane of $MnO_2$, respectively. HRTEM images and energy dispersion spectroscopy (EDS) mapping provide detailed information on triple-core/shell nanostructures.

Figure 8C:
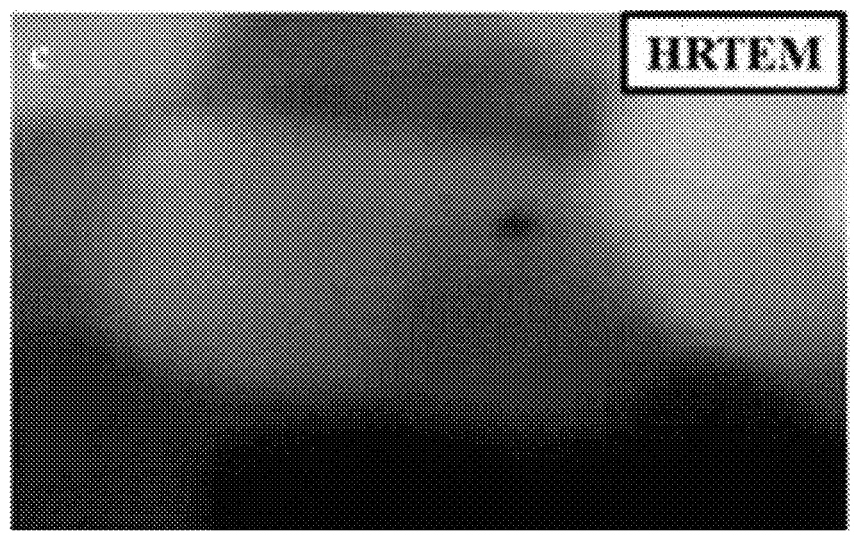
FIG. 8C is an HRTEM image showing an original TiO$_2$@MnO$_2$@C nanoparticle shape.

FIG. 8C is an HRTEM image showing an original $TiO_2@MnO_2@C$ nanoparticle shape.

Figure 8D:
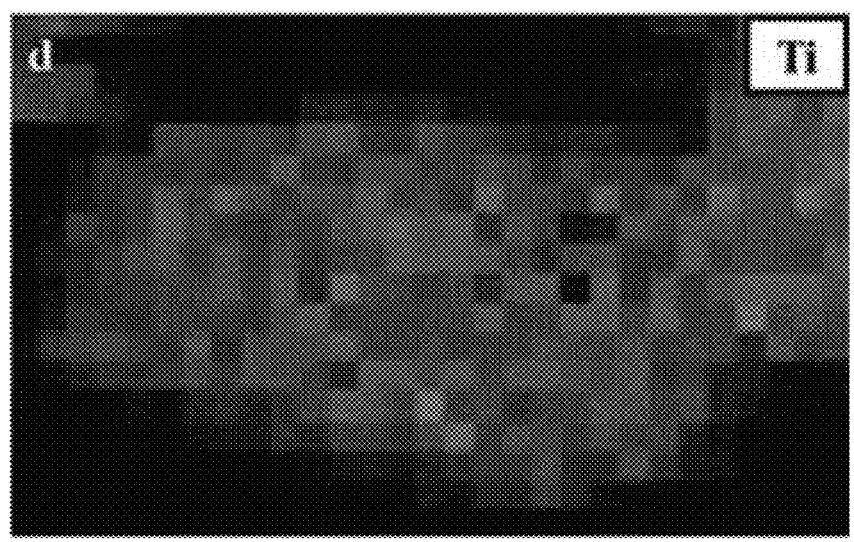
FIG. 8D shows EDS mapping for titanium (Ti) atoms of the same TiO$_2$@MnO$_2$@C nanoparticles indicating that Ti is disposed within the core-shell structure.

FIG. 8D shows EDS mapping for titanium (Ti) atoms of the same $TiO_2@MnO_2@C$ nanoparticles indicating that Ti is disposed within the core-shell structure.

Figure 8E:
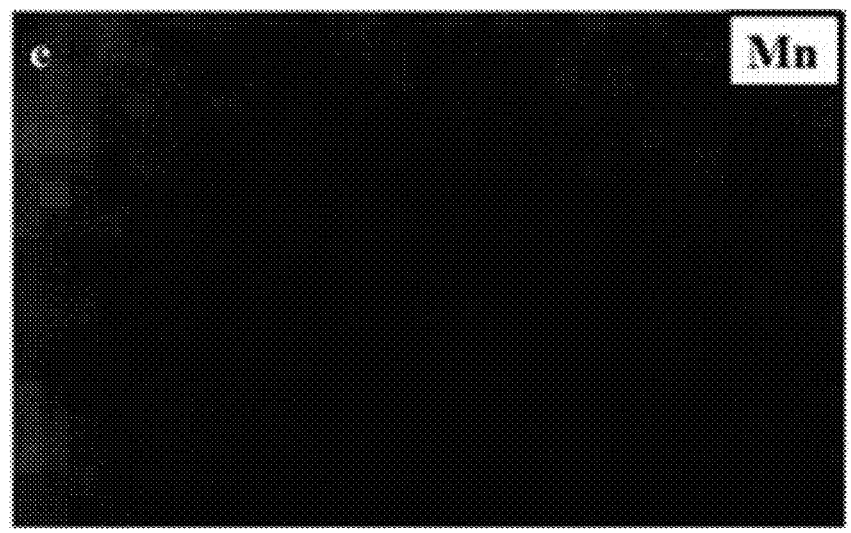
FIGS. 8E and 8F show EDS mapping for manganese (Mn) and carbon (C) atoms of TiO$_2$@MnO$_2$@C.
Figure 8F:
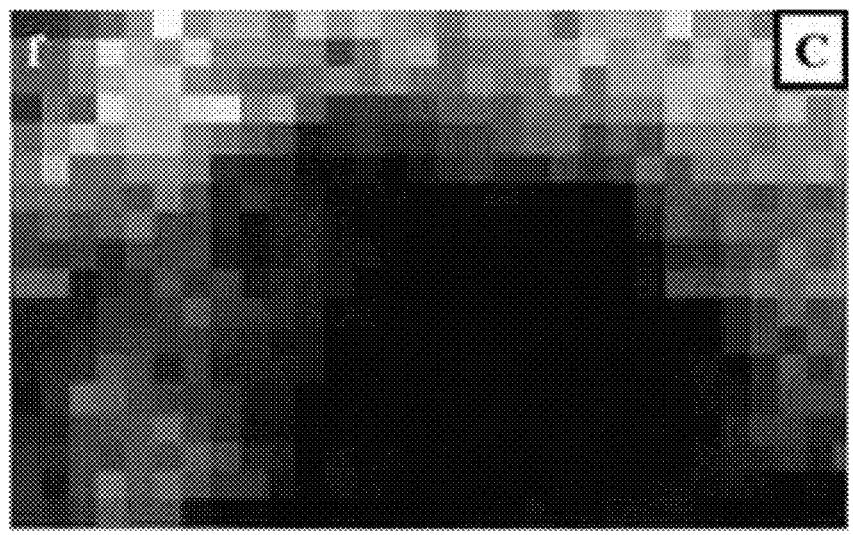

FIGS. 8E and 8F show EDS mapping for manganese (Mn) and carbon (C) atoms of $TiO_2@MnO_2@C$. Both Mn and C atoms were observed in the shell of $TiO_2@MnO_2@C$ nanoparticles that represent an ultimate physical structure as well as the distribution of the chemical structure.

Electrochemical Performance of $TiO_2@MnO_2@C$ Nanoparticle-based Supercapacitor Electrode Electrochemical measurement was to evaluate performance of supercapacitor electrodes having $TiO_2$, $TiO_2@MnO_2$, and $TiO_2@MnO_2@C$ nanostructures.

A nanotube-adsorbed carbon nanotube film was used as a working electrode in a potentiostat, an Ag/AgCl electrode was used as a reference electrode, and a platinum wire was used as a counter electrode. Performance of a half-cell supercapacitor was electrochemically analyzed using 1M $Na_2SO_4$ as an electrolyte. Carbon nanotubes constituting the carbon nanotube film are multi-wall carbon nanotubes. Nanoparticles may be $TiO_2$, $TiO_2@MnO_2$, and $TiO_2@MnO_2@C$ nanoparticles. Accordingly, three types of carbon nanotube film were tested. When a voltage is applied to the reference electrode, a reaction occurs at the working electrode and a current flowing to the counter electrode is detected.

On the other hand, a 1M $Na_2SO_4$ aqueous solution was used as an electrolyte, synthesized nanoparticles were used as an active material, a carbon nanotube film is used as a current collector of a working electrode, and the Ag/AgCl electrode was used as a reference electrode, and a platinum wire was used as a counter electrode.

A design concept of a triple-core/shell nanostructure is based on independent roles of $TiO_2$, $MnO_2$, and carbon. A $TiO_2$ core is a significantly stable metal oxide which should be able to maintain an entire structure without severe aggregation or thermochemical degradation in spite of high-temperature synthesis conditions and charge-discharge cycling. The $MnO_2$ shell is responsible for specific capacitance due to high pseudo-capacitance. Ultimately, the carbon shell improves the electrical conductivity and charge/discharge cycle stability between $TiO_2@MnO_2$ nanoparticles.

For a filtered carbon nanotube film, a carbon nanotube film to which single-core $TiO_2$ nanoparticles are adsorbed, a carbon nanotube film to which double-core shell $TiO_2@MnO_2$ are nanoparticle adsorbed, and a carbon nanotube film to which triple-core/shell $TiO_2@MnO_2@C$ nanoparticles are adsorbed, a cyclic voltammetry (CV) curve was measured at various scanning rates of 5-500 mV/s in a potential window of 0 to 1.0 V.

FIGS. 9A, 9B, 9C, and 9D show cyclic voltammetry (CV) curves of supercapacitor electrodes according to an example embodiment of the present disclosure.

Figure 9A:
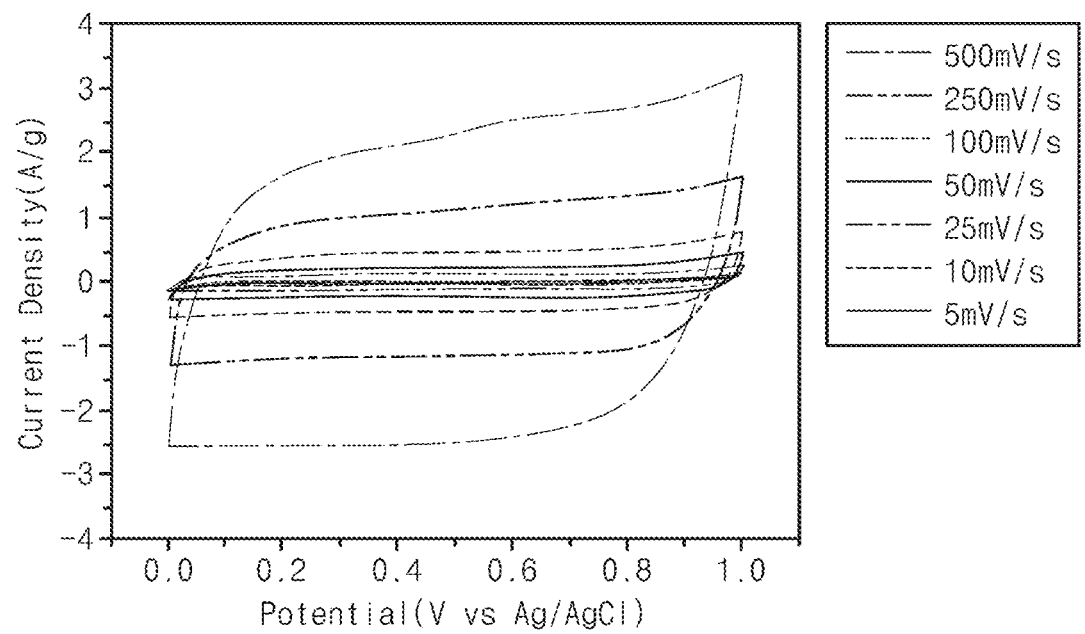
FIG. 9A shows cyclic voltammetry (CV) curves of supercapacitor electrodes according to an example embodiment of the present disclosure.

Referring to FIG. 9A, a CV curve of a filtered carbon nanotube film is a rectangular CV which implies excellent electrical conductivity of an electrode. A maximum specific capacitance of the filtered carbon nanotube film is 8.9 F/g at a scanning rate of 5 mV/s. A large external diameter (20 nm to 40 nm) of a multi-walled carbon nanotube and the absence of active materials result in low capacitance. Accordingly, a filtered carbon nanotube film serves as a current collector which hardly contributes to specific capacitance of the active materials.

Figure 9B:
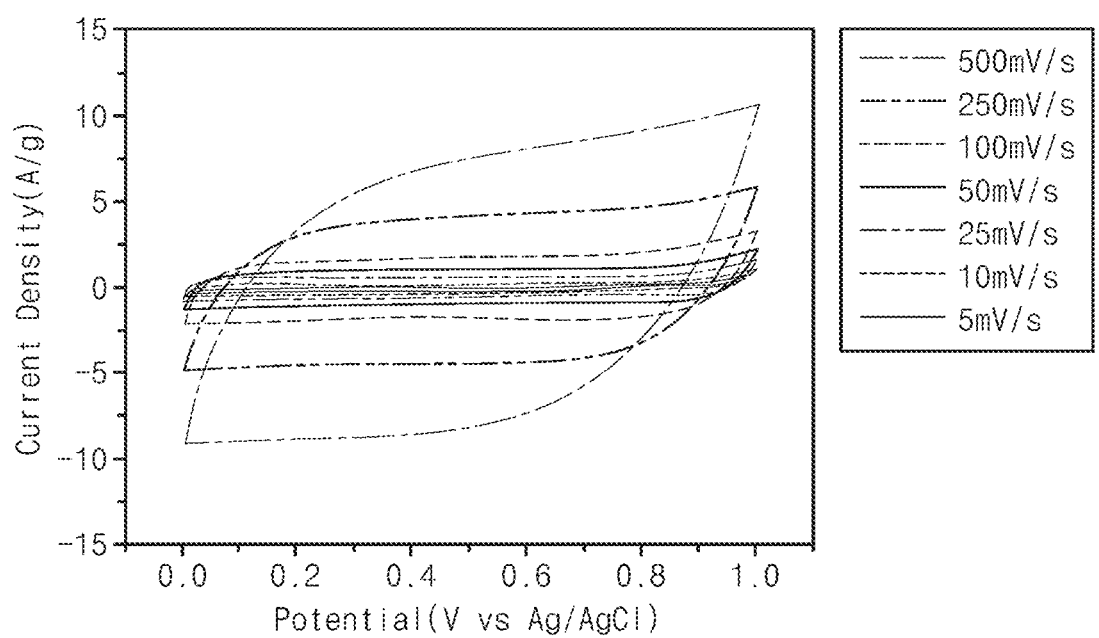
FIG. 9B shows cyclic voltammetry (CV) curves of supercapacitor electrodes according to an example embodiment of the present disclosure.

Referring to FIG. 9B, a CV curve of a carbon nanotube film to which single-core $TiO_2$ nanoparticles are adsorbed has a rectangular shape, which is interpreted that unhydrogenated intrinsic $TiO_2$ nanoparticles of an anatase phase are have low electrical conductivity and that the intrinsic $TiO_2$ nanoparticles are mixed with the carbon nanotube dispersion.

The $TiO_2$ nanoparticles may interfere with charge transfer and result in low electrical conductivity between carbon nanotubes. Maximum specific capacitance of the $TiO_2$ nanoparticle-based electrode was 50.0 F/g, which is relatively low due to electrochemically stable characteristics of $TiO_2$.

Figure 9C:
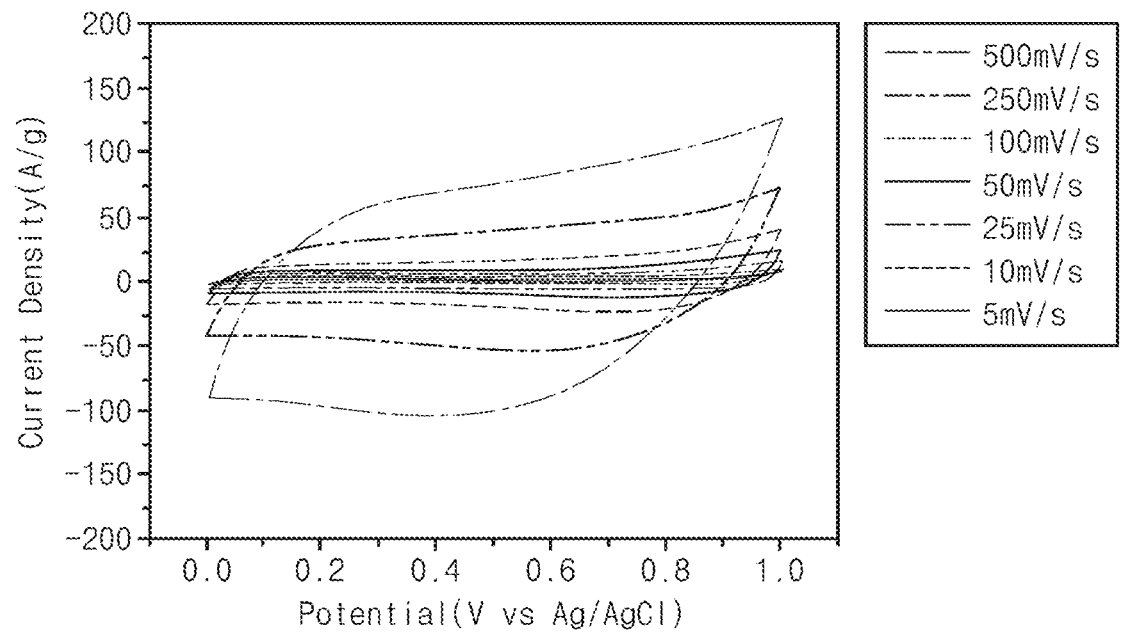
FIG. 9C shows cyclic voltammetry (CV) curves of supercapacitor electrodes according to an example embodiment of the present disclosure.

Referring to FIG. 9C, specific capacitance of the carbon nanotube film to which double-core/shell $TiO_2$@$MnO_2$ nanoparticles are adsorbed is 460 F/g at a scanning rate of 5 mV/s. A $MnO_2$ nanostructure is an electrochemical active material having a high theoretical specific capacitance of 1370 F/g.

The presence of the $MnO_2$ shell may increase electrical resistance through a core-shell structure. Moreover, charge transfer of a reversible redox reaction generally requires excessive time and charge transfer of a $MnO_2$ crystal having reversible intercalation-deintercalation of $Na^+$ ions may delay an entire transportation behavior.

Figure 9D:
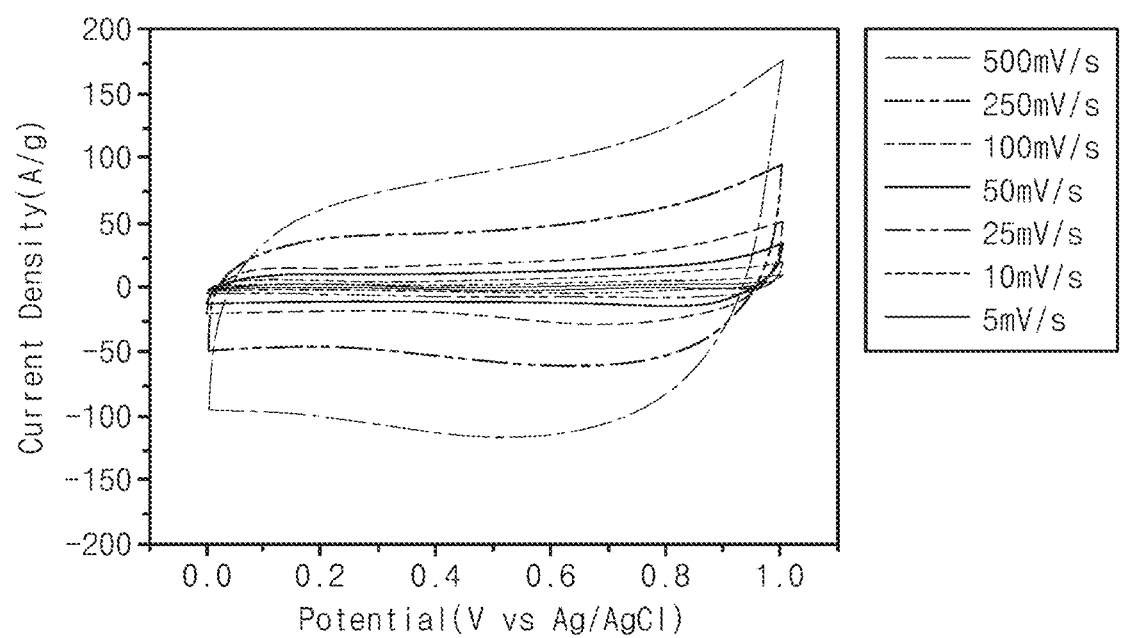
FIG. 9D shows cyclic voltammetry (CV) curves of supercapacitor electrodes according to an example embodiment of the present disclosure.

Referring to FIG. 9D, specific capacitance of a carbon nanotube film to which triple-core/shell $TiO_2$@$MnO_2$@C are absorbed exhibits the largest capacitance (more than 488 F/g) at a scanning speed of 5 mV/s. A current response is restored to a rectangular shape.

A continuous network of an external carbon shell surrounding $TiO_2$@$MnO_2$ may improve electrical conductivity of a supercapacitor electrode and provide an internal highway for charge transfer between metal oxide nanoparticles having intrinsically poor electrical conductivity. In addition, the carbon shell may improve charge transport between nanoparticles and a current collector.

FIGS. 10A, 10B, 10C, 10D, 10E, and 10F show graphs illustrating electrochemical characteristics according to example embodiments of the present disclosure.

Figure 10A:
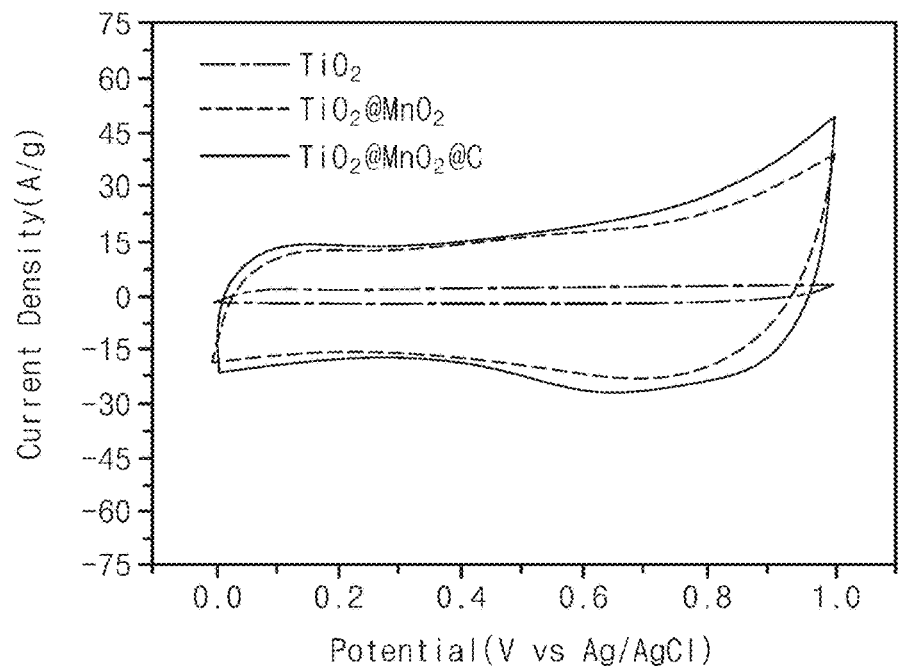
FIG. 10A shows cyclic voltammetry (CV) curves for TiO$_2$, TiO$_2$@MnO$_2$, and TiO$_2$@MnO$_2$@C illustrating electrochemical characteristics according to example embodiments of the present disclosure.

Referring to FIG. 10A, a similar trend was observed, compared with a CV curve at a scanning rate of 100 mV/s. However, specific capacitance was reduced, compared with the case of 5 mV/s.

A $TiO_2$@$MnO_2$-based electrode has specific capacitance of 327 F/g, and a $TiO_2$@$MnO_2$@C-based electrode has specific capacitance of 395 F/g. A $TiO_2$-based electrode has specific capacitance of 39.8 F/g. Due to intrinsic electrochemical capacitance of $MnO_2$ in an electrolyte containing alkali metal ions such as lithium, sodium or potassium, the specific capacitance of the $TiO_2$@$MnO_2$-based electrode or the specific capacitance of the $TiO_2$@$MnO_2$@C-based electrode is higher than the specific capacitance of the $TiO_2$-based electrode.

A redox reaction of $MnO_2$ with an electrolyte may be explained by an electrochemical redox reaction formula, as follows:

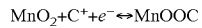

$$MnO_2 + C^+ + e^- \leftrightarrow MnOOC$$

where $C^+$ denotes a cation containing a proton ($H^+$) and an alkali metal cation. According to an abrupt current density slope induced by additional charge transfer through a nanostructure from a carbon shell, a current density level of $TiO_2$@$MnO_2$@C was slightly higher than a current density level of $TiO_2$@$MnO_2$ in reaction with change in charge-discharge mode between potential windows of 0 V to 0.1 V.

Figure 10B:
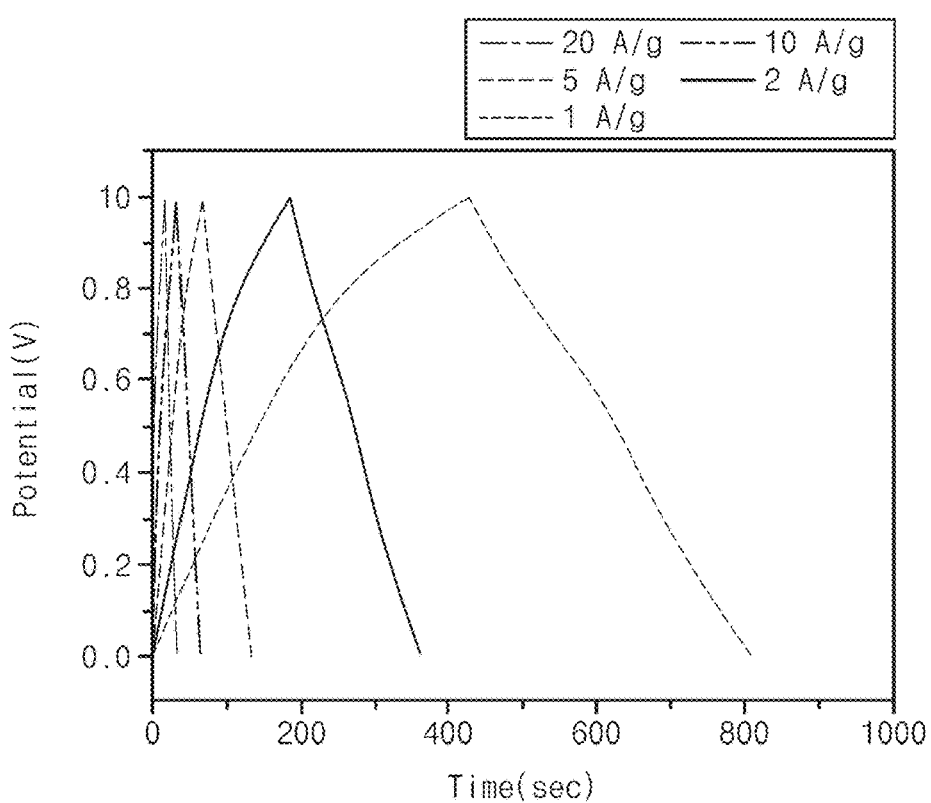
FIGS. 10B and 10C show galvanostatic charge-discharge curves for TiO$_2$@MnO$_2$, and TiO$_2$@MnO$_2$@C within a voltage range from 0 V to 1 V at various current densities of 1 A/g to 20 A/g.
Figure 10C:
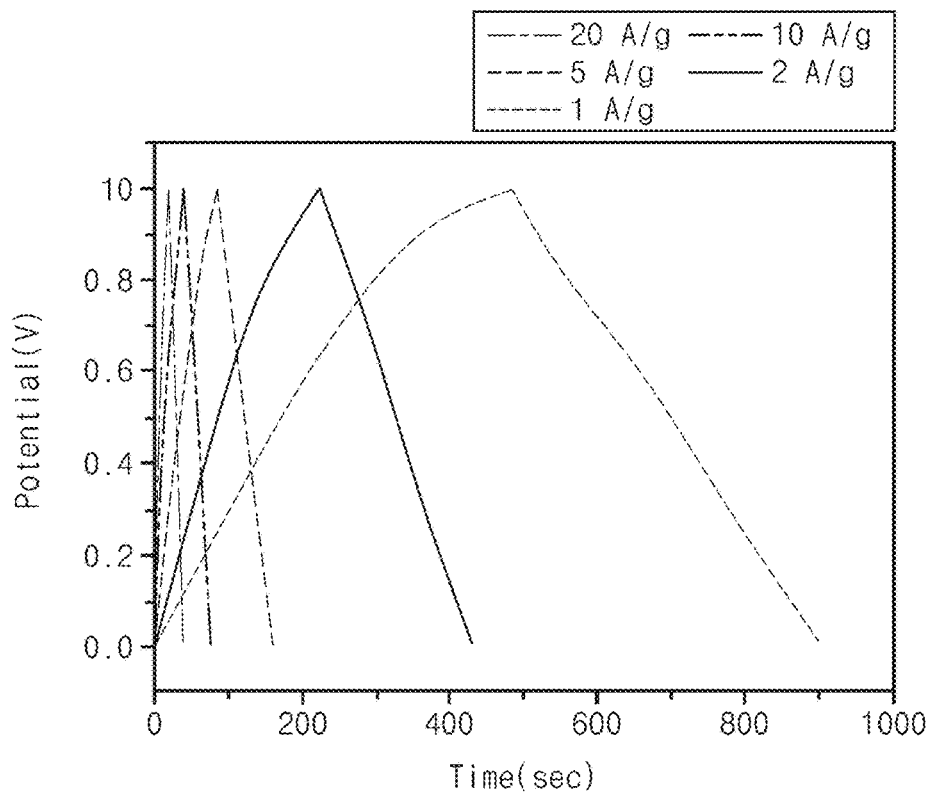

FIGS. 10B and 10C show galvanostatic charge-discharge curves for $TiO_2$@$MnO_2$, and $TiO_2$@$MnO_2$@C within a voltage range from 0 V to 1 V at various current densities of 1 A/g to 20 A/g.

All curves represent ideal bilateral symmetrical shapes at a maximum charge voltage point indicating a small drop in internal resistance and linear energy quantity slopes for charge/discharge intervals.

On the other hand, a $TiO_2$@$MnO_2$@C nanostructure-based electrode has longer charge and discharge times than a $TiO_2$@$MnO_2$-based nanostructure electrode at the same current density due to the presence of conductive carbon shells.

Figure 10D:
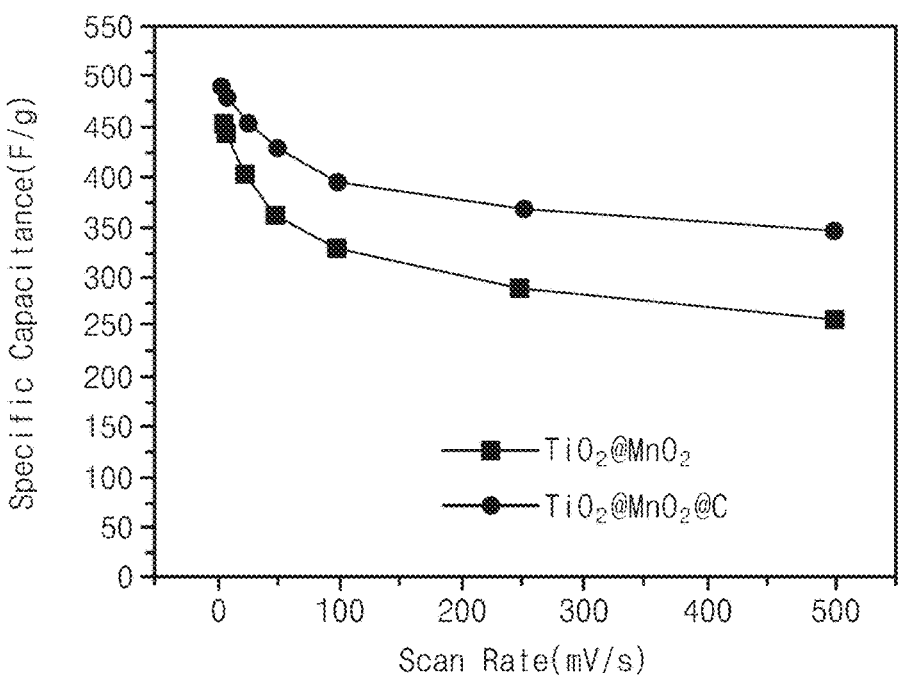
FIGS. 10D and 10E show specific capacitance of the TiO$_2$@MnO$_2$ nanostructure-based electrode and specific capacitance of the TiO$_2$@MnO$_2$@C nanostructure-based electrode at various scanning rates (5 mV/s to 500 mV/s) and current densities (1 A/g to 20 A/g).
Figure 10E:
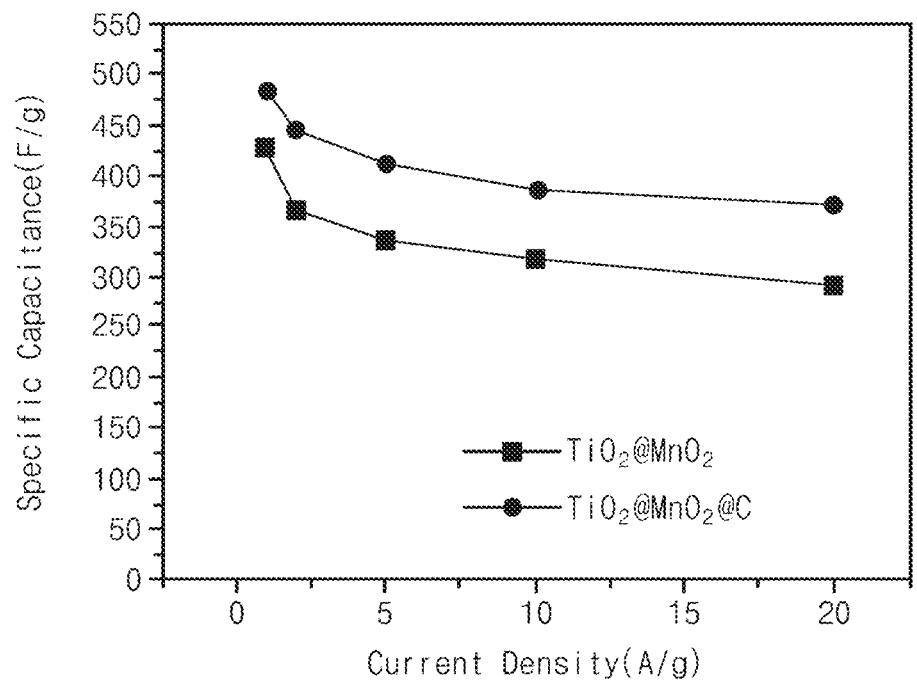

FIGS. 10D and 10E show specific capacitance of the $TiO_2$@$MnO_2$ nanostructure-based electrode and specific capacitance of the $TiO_2$@$MnO_2$@C nanostructure-based electrode at various scanning rates (5 mV/s to 500 mV/s) and current densities (1 A/g to 20 A/g).

The $TiO_2$@$MnO_2$@C nanostructure-based electrode had better retention than the $TiO_2$@$MnO_2$ nanostructure-based electrode at high scanning rates or current densities because an external carbon shell promotes a pseudo-capacitive reaction in a high-speed scan. In addition, a drop rate of specific capacitance between 5 mV/s and 500 mV/s was significantly lower. These results represented a stable operation at various scanning rates.

Figure 10F:
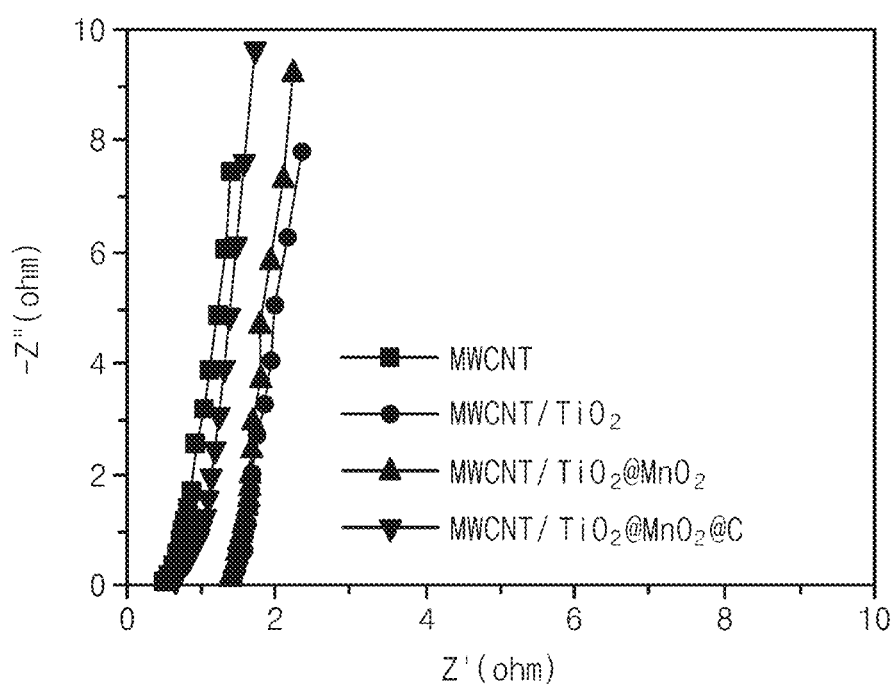
FIG. 10F shows a Nyquist plot for electrodes different from each other.

FIG. 10F shows a Nyquist plot for electrodes different from each other.

Electrochemical impedance spectroscopy (EIS) analysis was performed on various electrodes within various frequency ranges from 100 kHz to 0.1 Hz.

Equivalent series resistance of a filtered carbon nanotube film-based electrode is 0.45 ohm. Equivalent series resistance of a carbon nanotube film-based electrode to which single-core $TiO_2$ nanoparticles are adsorbed is 1.39 ohm. Equivalent series resistance of a carbon nanotube film-based electrode to which double-core/shell $TiO_2$@$MnO_2$ nanoparticles are adsorbed is 1.38 ohm. Equivalent series resistance of a carbon nanotube film-based electrode to which triple-core/shell $TiO_2$@$MnO_2$@C nanoparticles are adsorbed is 0.69 ohm. Simultaneously, a frequency response increases due to an increase in specific capacitance as a capacitive material is electrochemically added to a shell.

Figure 11A:
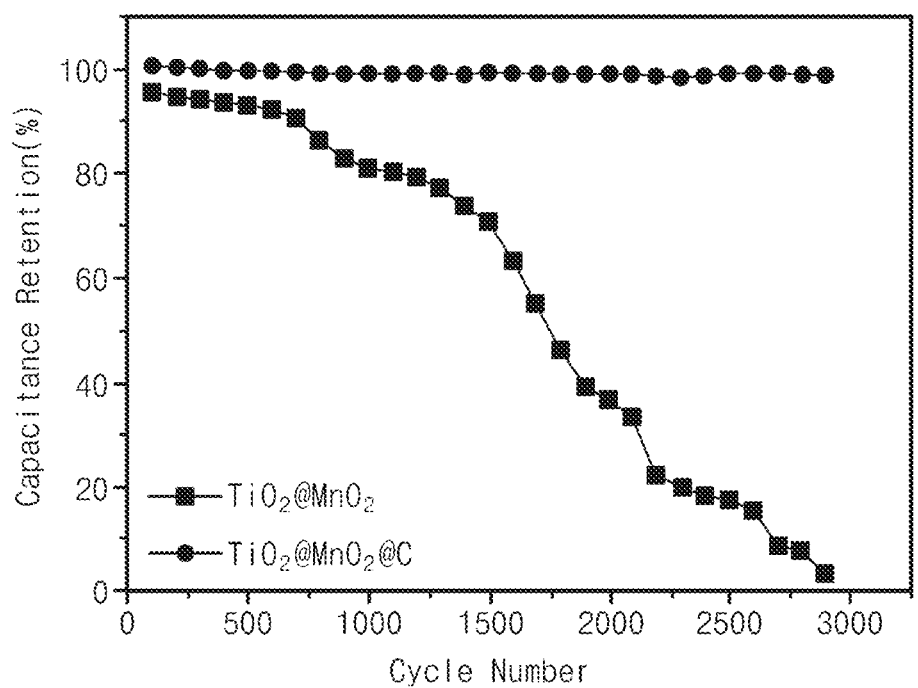
FIG. 11A shows long-term charge-discharge cycle performance in a 1.0 voltage window and at 1.0 A/g current density for TiO$_2$@MnO$_2$ and TiO$_2$@MnO$_2$@C nanostructure-based electrodes.
Figure 11B:
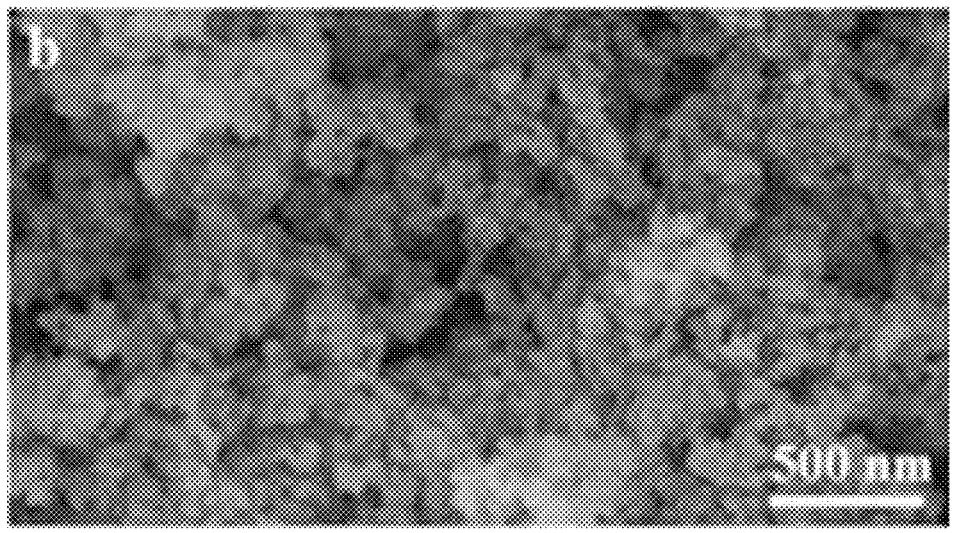
FIG. 11B shows a SEM image of the TiO$_2$@MnO$_2$@C nanoparticles before the cycle test.
Figure 11C:
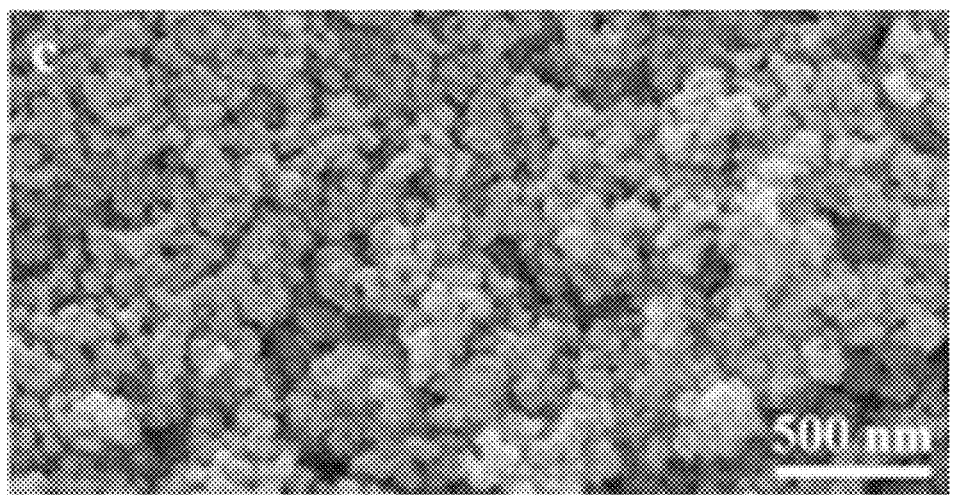
FIG. 11C shows a SEM image of the TiO$_2$@MnO$_2$@C nanoparticles after a long-term charge-discharge test.

FIGS. 11A, 11B, and 11C illustrate stability of $TiO_2$@$MnO_2$ and $TiO_2$@$MnO_2$@C nanostructure-based electrodes.

FIG. 11A shows long-term charge-discharge cycle performance in a 1.0 voltage window and at 1.0 A/g current density for $TiO_2$@$MnO_2$ and $TiO_2$@$MnO_2$@C nanostructure-based electrodes. The $TiO_2$@$MnO_2$@C nanostructure-based electrode significantly improves stability of a supercapacitor electrode.

Specific capacitance of the $TiO_2$@$MnO_2$@C nanostructure-based electrode was maintained up to 98.7% over 3000 cycles, compared with an initial value. On the other hand, specific capacitance of the $TiO_2$@$MnO_2$ nanostructure-based electrode rapidly dropped to less than 2.5% over 3000 cycles, compared with the initial value. This difference is caused by the presence of carbon shells and core $TiO_2$ nanoparticles. First, $TiO_2$ nanoparticles having excellent mechanical and chemical stability act as a base durable against charge/discharge cycles. Second, deposition of a first structure-guided combustion wave-induced carbon film and replacement thereof with a thin $MnO_2$ film surrounding the $TiO_2$ nanoparticles provide a porous nanostructure configured to relax thermal and mechanical stress concentrations. Finally, a second structure-guided combustion wave-inducted carbon coating film provides improved electrical conductivity between $TiO_2@MnO_2$ nanostructures. Accordingly, a $MnO_2$ surface does not undergo the mechanical stress caused by intercalation of the alkali cations in an electrolyte during the charge-discharge cycle. In addition, the carbon shells and $TiO_2$ nanoparticles prevent physical and chemical degradation of the $MnO_2$ shell. Physical and chemical degradation includes oxidation, morphological changes, and structural transitions.

Hardness and durability of the core $TiO_2$ nanoparticles contribute to the long-term stability of the $TiO_2@MnO_2@C$ nanoparticles. Morphology and structural transformation of the $TiO_2@MnO_2@C$ nanoparticles before and after application of a long-term charge-discharge cycle test were investigated by SEM imaging.

Referring to FIG. 11B, before the cycle test, the $TiO_2@MnO_2@C$ nanoparticles had an intrinsic shape similar to a shape of prepared $TiO_2$ nanoparticles. Although structure-guided combustion waves were applied twice for triple core-shell structure synthesis, there was no aggregation.

Referring to FIG. 11C, after a long-term charge-discharge test was performed 3,000 times or more, the shape was maintained perfectly without structural transformation or aggregation. As a result, the presence of carbon shells between the nanoparticles in the $TiO_2@MnO_2@C$ nanoparticle-based electrode may prevent thermochemical degradation and the intrinsic characteristics of the $TiO_2$ nanoparticles may prevent physical transformation in spite of long-term cycling.

In conclusion, according to an example embodiment, a new method of synthesizing a multi-core/shell nanostructure of a metal oxide and a carbon-based material using structure-guided combustion waves (SGCWs) is proposed. A triple core-shell nanostructure of $TiO_2@MnO_2@C$ may be used as a supercapacitor electrode material, and is synthesized through structure-guided combustion waves which emerge during combustion of a hybrid composite including micro-nanostructured materials and chemical fuels. As an ignition of the chemical fuel, an entire micro-nanostructure is immediately exposed to self-propagating reaction waves along an interface between the micro-nanostructured material and the chemical fuel. Such interface-driven combustion waves simultaneously induce formation of a carbon shell around a core structure for several seconds in an open-air atmosphere.

In a hybrid composite of $TiO_2$ nanoparticles (NPs) and nitrocellulose (NC), structure-guided combustion waves allow a thin carbon film to be deposited around the $TiO_2$ nanoparticles (NPs) due to residual carbonaceous fuels during incomplete combustion.

The synthesized $TiO_2@C$ nanoparticles were converted into core-shell $TiO_2@MnO_2$ nanoparticles by replacing the carbon film with $MnO_2$. Next, in a hybrid composite of $TiO_2@MnO_2$ nanoparticles and nitrocellulose (NC), second structure-guided combustion waves are applied to synthesis of a carbon film to prepare triple-core/shell $TiO_2@MnO_2@C$ nanoparticles.

Supercapacitor electrodes using $TiO_2$, $TiO_2@MnO_2$, $TiO_2@MnO_2@C$ nanoparticles were analyzed to compare their electrochemical performance depending on the presence of a $MnO_2$ sheath and a carbon sheath. The $TiO_2@MnO_2@C$-based nanostructure has specific capacitance (488 F/g at 5 m/V) higher than specific capacitance of a $TiO_2$-based nanostructure (50 F/g) and specific capacitance of a $TiO_2@MnO_2$-based nanostructure (460 F/g) due to high capacitance of the $MnO_2$ shell. The $TiO_2@MnO_2@C$-based nanostructure has high conductivity due to the carbon shell. In terms of cycle stability, the $TiO_2@MnO_2@C$-based nanostructure was significantly stable over 3000 cycles (98.7% after 3000 cycles at a current density of 1.0 A/g) due to less degradation of the $MnO_2$ shell through $TiO_2$ and the carbon shell on internal and external sides, while $TiO_2@MnO_2$ exhibited poor stability (2.5%). The result confirms that a core-shell structure synthesized by structure-guided combustion waves may effectively improve functions of a supercapacitor electrode material. In addition, structure-guided combustion wave synthesis enables an easy and new path for scalable synthesis of multi-core/shell structures applicable to a wide range of electrochemical applications.

A method of preparing core/shell nanoparticles according to an example embodiment of the present disclosure may coat a carbon film on core nanoparticles without long-term high-temperature annealing, unlike a conventional nanoparticle process of coating a carbon film using instantaneous combustion of a carbon-containing organic chemical fuel. A method of synthesizing multi-core/shell nanoparticles according to an embodiment of the present disclosure may form a core/shell structure coated with a carbon film without chemical and mechanical changes of the core nanoparticles.

A method of synthesizing core/shell nanoparticles according to an embodiment of the present disclosure provides a method of replacing a carbon film with a metal oxide used as an energy storage material such as a supercapacitor, a battery, or the like using a simple redox reaction. Accordingly, since multi-core/shell nanoparticles have excellent mechanical stability, stability may be provided in application of energy storage materials.

A method of synthesizing core/shell nanoparticle according to an example embodiment of the present disclosure may synthesize nanoparticles having double or multiple shells through carbon film coating using a porous fuel membrane and combustion waves. Accordingly, core/shell structure nanoparticles which are not agglomerated with each other are synthesized to apply electrical conductivity and mechanical and chemical stability of the carbon film to nanoparticles. Non-aggregated core/shell structure nanoparticles may be added with a process of forming multiple shells. The multi-core/shell structure nanoparticles may be used as an active material of a supercapacitor to improve stability and performance of the energy storage material.

Although the present disclosure and its advantages have been described in detail, it should be understood that various changes, substitutions and alterations can be made herein without departing from the spirit and scope of the disclosure as defined by the following claims.

What is claimed is:

1. A method of synthesizing multi-shell structure nanoparticles, the method comprising:
uniformly distributing core nanoparticles to a first porous fuel membrane, wherein the first porous fuel membrane is a substrate made of fuel;
coating the core nanoparticles fixed to the first porous fuel membrane with a fuel; and
combusting the fuel coated on the core nanoparticles and the first porous fuel membrane to coat a first carbon film on surfaces of the core nanoparticles.

2. The method according to claim 1, further comprising at least one of:
replacing the first carbon film with a metal oxide layer using a reduction/oxidation (redox) reaction to prepare preliminary nanoparticles;
uniformly distributing the preliminary nanoparticles to a second porous fuel membrane;

coating the preliminary nanoparticles fixed to the second porous fuel membrane with a fuel; and combusting the fuel coated on the preliminary nanoparticles and the second porous fuel membrane to coat a second carbon film on surfaces of the preliminary nanoparticle.

3. The method according to claim 2, wherein the uniformly distributing core nanoparticles to a first porous fuel membrane comprises:

mixing the core nanoparticles with deionized water and dispersing a mixture of the core nanoparticles and deionized water using a sonicator;

uniformly distributing the core nanoparticles to the first porous fuel membrane using vacuum filtration to prepare a core nanoparticle/porous fuel membrane structure; and drying the core nanoparticle/porous fuel membrane structure.

4. The method according to claim 2, wherein the coating the core nanoparticles fixed to the first porous fuel membrane with a fuel comprises:

spraying a collodion solution, in which a fuel is dissolved in an organic solve, onto the first porous fuel membrane and drying the sprayed collodion solution.

5. The method according to claim 2, wherein the combusting the fuel to coat a first carbon film on surfaces of the core nanoparticles comprises:

igniting the fuel and the first porous fuel membrane using laser heating or Joule heating to coat a first carbon film on the surfaces of the core nanoparticles by structure-guided combustion waves.

6. The method according to 2, wherein the metal oxide layer is a manganese dioxide, and the replacing the first carbon film with a metal oxide layer using a redox reaction to prepare preliminary nanoparticles comprises dipping the core nanoparticles with the first carbon film in an aqueous solution of $KMnO_4$ to reduce the first carbon film into the metal oxide layer by a reduction/oxidation (redox) reaction of $KMnO_4$ and carbon.

7. The method according to claim 2, wherein the uniformly distributing the preliminary nanoparticles to a second porous fuel membrane comprises:

mixing the preliminary nanoparticles with deionized water and dispersing a mixture of the preliminary nanoparticles and deionized water using a sonicator;

uniformly distributing the preliminary nanoparticles to the second porous fuel membrane using vacuum filtration to prepare a preliminary nanoparticle/porous fuel membrane structure; and drying the preliminary nanoparticle/second porous fuel membrane structure, and the coating the preliminary nanoparticles fixed to the second porous fuel membrane with a fuel comprises spraying a collodion solution, in which a fuel is dissolved in an organic solvent, onto the second porous fuel membrane and drying the sprayed the collodion solution.

8. The method according to claim 2, wherein the combusting the fuel coated on the preliminary nanoparticles and the second porous fuel membrane to coat the second carbon film on surfaces of the preliminary nanoparticle comprises igniting the fuel and the second porous fuel membrane using laser heating or Joule heating to coat the second carbon film on the surfaces of the preliminary nanoparticles by self-propagation combustion waves.

9. The method according to claim 1, wherein the core nanoparticle is a metal particle or a metal-alloy particle including at least one of copper (Cu), silver (Ag), gold (Au), nickel (Ni), and aluminum (Al), or a metal oxide particle including at least one of $SiO_2$, $Al_2O_3$, $ZrO_3$, and $TiO_2$.

10. The method according to claim 1, wherein the metal oxide layer includes at least one of $MnO_2$ and $RuO_2$.

11. The method according to claim 1, wherein each of the first and second porous fuel membranes is made of a nitrocellulose material, and the fuel is nitrocellulose, a chemical fuel containing a nitro group, or a combustible organic matter.

12. A method of fabricating an electrode including nanoparticles, the method comprising:

uniformly distributing core nanoparticles to a first porous fuel membrane;

coating the core nanoparticles fixed to the first porous fuel membrane with a fuel;

combusting the fuel coated on the core nanoparticles and the first porous fuel membrane to coat a first carbon film on surfaces of the core nanoparticles;

replacing the first carbon film with a metal oxide layer to produce preliminary nanoparticles;

uniformly distributing the preliminary nanoparticles to a second porous fuel membrane;

coating the preliminary nanoparticles fixed to the second porous fuel membrane with a fuel; and combusting the fuel coated on the preliminary nanoparticles and the second porous fuel membrane to coat a second carbon film on surfaces of the preliminary nanoparticles to produce multi-shell structure nanoparticles.

13. The method as set forth in claim 12, further comprising:

dispersing the multi-shell structure nanoparticles in deionized water to prepare a multi-shell structure nanoparticle dispersing agent;

forming a carbon nanotube film by means of vacuum filtration using a carbon nanotube dispersing agent in which in which carbon nanotubes are dispersed in an aqueous solution of sodium dodecyl sulfate (SDS);

filtering the multi-shell structure nanoparticle dispersing agent through the carbon nanotube film to adsorb the multi-shell nanoparticle to the carbon nanotube film; and attaching the carbon nanotube film, to which the multi-shell structure nanoparticles are adsorbed, to an electrode of a supercapacitor.

* * * * *